United States Patent
Ohtomo et al.

[11] Patent Number: 6,000,213
[45] Date of Patent: Dec. 14, 1999

[54] COMBINED CYCLE POWER PLANT

[75] Inventors: Fumio Ohtomo, Zama; Yuji Nakata, Yokohama; Yoshitaka Fukuyama, Yokohama; Asako Inomata, Yokohama; Sachio Shibuya, Tokyo; Akinori Koga; Junji Ishii, both of Yokohama; Shoko Ito, Sagamihara; Hironobu Yamamoto, Yokohama, all of Japan

[73] Assignee: Kabushiki Kaisha Toshiba, Kawasaki, Japan

[21] Appl. No.: 09/114,095

[22] Filed: Jul. 13, 1998

Related U.S. Application Data

[62] Division of application No. 08/716,868, Sep. 20, 1996, Pat. No. 5,778,657.

[30] Foreign Application Priority Data

Sep. 22, 1995 [JP] Japan .................................... 7-244750
Sep. 22, 1995 [JP] Japan .................................... 7-244751

[51] Int. Cl.⁶ ........................................................ F02C 6/18
[52] U.S. Cl. ........................................ 60/39.182; 60/39.75
[58] Field of Search ................................ 60/39.07, 39.15, 60/39.182, 39.75

[56] References Cited

U.S. PATENT DOCUMENTS

| | | |
|---|---|---|
| 4,424,668 | 1/1984 | Mukherjee . |
| 4,571,935 | 2/1986 | Rice . |
| 5,412,937 | 5/1995 | Tomlinson et al. . |
| 5,471,832 | 12/1995 | Sugita et al. ........................... 60/39.182 |
| 5,538,394 | 7/1996 | Inomata et al. . |
| 5,613,356 | 3/1997 | Frutschi . |
| 5,647,199 | 7/1997 | Smith .................................... 60/39.182 |

FOREIGN PATENT DOCUMENTS

| | | |
|---|---|---|
| 04-86308 | 3/1992 | European Pat. Off. . |
| 5-141267 | 6/1993 | European Pat. Off. . |
| 0 735 254 | 10/1996 | European Pat. Off. . |
| 08 277726 | 10/1996 | European Pat. Off. . |
| 0 743 425 A1 | 11/1996 | European Pat. Off. . |
| 60-201011 | 10/1985 | Japan . |
| 63-40244 | 8/1988 | Japan . |
| 2-241902 | 9/1990 | Japan . |
| 6-93810 | 4/1994 | Japan . |

OTHER PUBLICATIONS

Patent Abstracts of Japan, vol. 17, No. 530 (M–1485), Sep. 24, 1993, JP 05 141267, Jun. 8,1993.
Patent Abstracts of Japan, vol. 16, No. 311(M–1277), Jul. 8, 1992, JP 04 086308, Mar. 18, 1992.
Patent Abstracts of Japan, vol. 97, No. 2, Feb. 28, 1997, JP 08 277726, Oct. 22, 1996.

*Primary Examiner*—Louis J. Casaregola
*Attorney, Agent, or Firm*—Oblon, Spivak, McClelland, Maier & Neustadt, P.C.

[57] ABSTRACT

A combined cycle power plant comprises a gas turbine system and a steam cycle system having a steam turbine to be driven by the steam generated by the waste heat of the exhaust gas of the gas turbine system, wherein the steam from the steam cycle system flows through a gas turbine cooling system of the gas turbine to cool the gas turbine blades and other elements of the gas turbine system to be cooled and the waste heat of the gas turbine system is effectively collected. The gas turbine cooling system has two or more than two coolooling ducts formed in two or more than two elements of the gas turbine system to be cooled such as the gas turbine blades and the combustor of the gas turbine system so that steam is made to flow through the cooling ducts of these two or more than two elements to be cooled to effectively and maximally exploit the cooling potential and the waste heat collecting potential of the steam and hence improve the overall thermal efficiency of the plant.

6 Claims, 16 Drawing Sheets

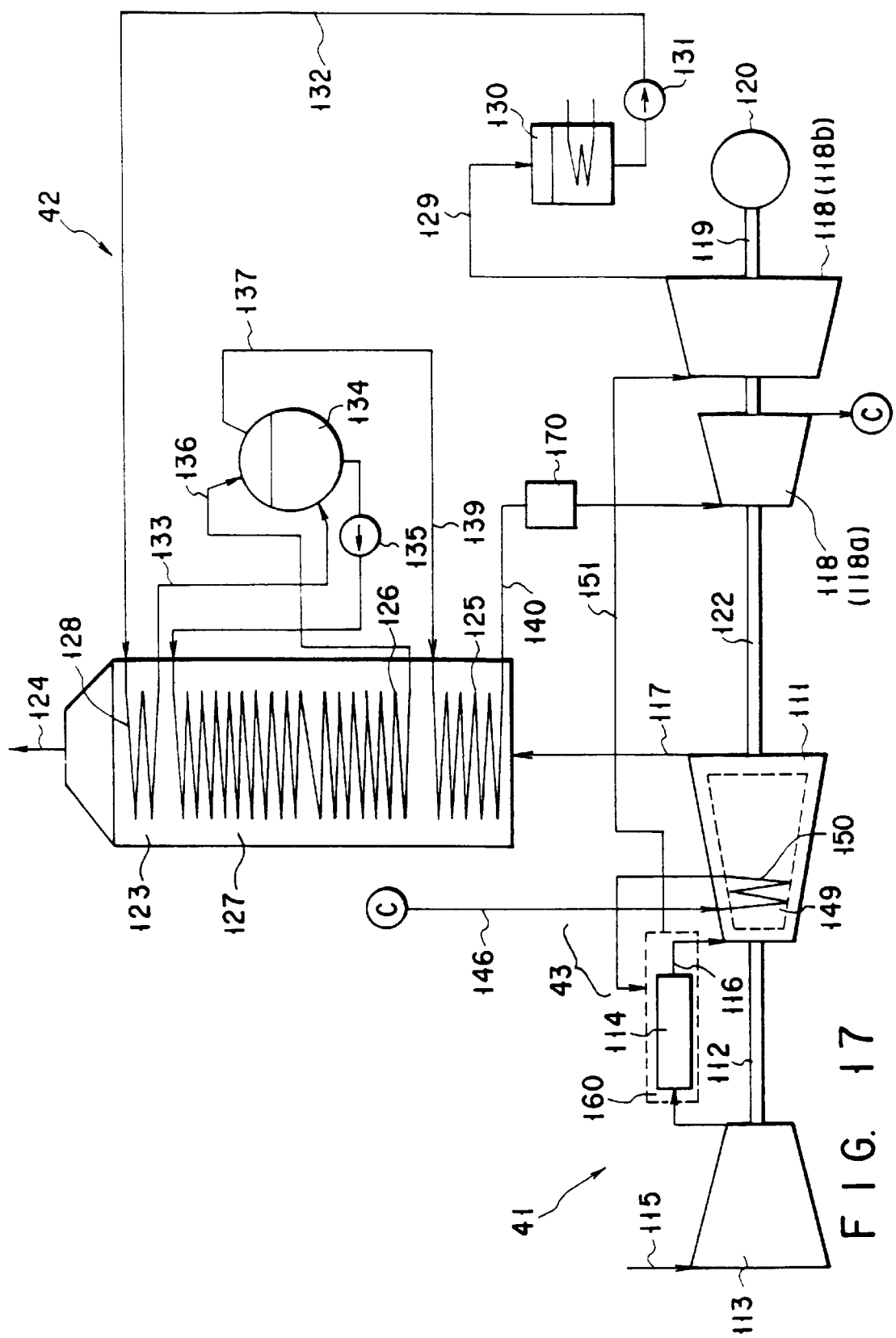

COMBINED CYCLE POWER PLANT

This application is a Division of application Ser. No. 08/716,868, filed on Sep. 20, 1996, now U.S. Pat. No. 5,778,657.

BACKGROUND OF THE INVENTION

1. Field of the Invention

This invention relates to a combined cycle power plant realized by consolidating a gas turbine system and a steam cycle system, each being provided with one or more than one turbines.

More specifically, the present invention relates to a combined cycle power plant designed to improve the overall thermal efficiency of the plant by collecting the waste heat of the gas turbine system in said steam cycle system and enhancing the efficiency of collecting the waste heat of said gas turbine system.

2. Description of the Related Art

There are known combined cycle power plants comprising a gas turbine system and a steam cycle system, wherein the steam cycle system is bled of steam and the bled steam is used as a cooling medium for cooling the turbine blades of the gas turbine while the heat collected by the cooling operation is returned to the steam cycle system to improve the overall thermal efficiency of the plant.

Combined power plants of the above identified type are advantageous in that the turbine inlet gas temperature can be raised to improve the thermal efficiency of the turbine as a result of the cooling operation using steam as a cooling medium and, at the same time, the waste heat of the gas turbine system is partly collected and returned to the steam cycle system to improve the overall thermal efficiency of the plant.

FIG. 1 of the accompanying drawings schematically illustrates a known combined cycle power plant comprising a gas turbine system 1 and a steam cycle system 2 having a steam turbine driven by the waste heat of the gas turbine system 1.

The gas turbine system 1 by turn comprises a gas turbine 11, a compressor 13 coupled with the gas turbine 11 by means of a shaft 12 and a combustor 14 that receives compressed air and fuel from the compressor 13 and burns the fuel to produce hot high pressure gas for driving the gas turbine 11.

The compressor 13 compresses the ambient air fed in through an air duct 15 and the compressed air is partly used for cooling the blades and sealing the rotary components of the gas turbine 11, while the remaining compressed air is fed to the combustor 14.

The combustor 14 burns the fuel fed from a fuel supply system (not shown), using the compressed air as combustion sustaining gas. The hot gas obtained by combustion is then fed to the gas turbine 11 by way of a combustion gas duct 16 and allowed to inflate to drive the gas turbine 11 before flowing out through an exhaust gas duct 17.

On the other hand, the steam cycle system 2 comprises a steam turbine 18 and an electric generator 20 coupled with the steam turbine 18 by means of a shaft 19. A steam cycle is established in the steam cycle system as it generates steam by the waste heat of the gas turbine system 1 and the generated steam is used to drive the steam turbine 18. Note that the rotor of the steam turbine 18 and that of the gas turbine 11 are linked by a shaft 22 in FIG. 1.

The steam cycle system 2 is additionally provided with a waste heat collector boiler 23 for collecting heat from the exhaust of the gas turbine 11 fed through the exhaust gas duct 17 and generating hot high pressure steam necessary for driving the steam turbine 18. The exhaust gas from the waste heat collector boiler 23 is then emitted into the atmosphere by way of a flue 27.

A high pressure superheater 24, a high pressure evaporator 25 and a high pressure preheater 26 are arranged in the waste heat collector boiler 23 in the above mentioned order from the upstream side toward the downstream side thereof. These heaters and the steam turbine 18 are connected with each other in a manner as described below to establish a steam cycle 2.

The steam expelled from the steam turbine 18 is led to a steam condenser 29 by way of an expelled steam duct 28 and reduced to water at room temperature. The collected room temperature water is led to the high pressure preheater 26 by way of a circulation pump 30 and a circulation conduit 31 for preliminary heating and then to a high pressure drum 33 by way of a conduit 32 leading to the drum.

The pressurized water in the high pressure drum 33 is led to the high pressure evaporator 25 by way of a pressurized water circulation pump 34 and a pressurized water circulation conduit 35 for evaporation and the produced hot high pressure steam is returned to an upper space of the high pressure drum 33 by way of a return duct 36. The returned steam is then fed to the high pressure superheater 24 by way of a steam duct 37 for reheating and the heated steam is further fed to the steam turbine 18 by way of a steam supply duct 38.

In a combined cycle power plant having a configuration as described above, the inlet gas temperature of the gas turbine 11 is preferably made as high as possible in order to enhance the thermal efficiency of the plant. On the other hand, the combustor 14 and the stator vanes and the rotor blades of the gas turbine 11 have to be made of a highly heat-resistant material to achieve a high inlet gas temperature for the gas turbine 11.

The upper temperature limit of currently available heat-resistant super alloys that can be used for gas turbines is about 800 to 900° C. On the other hand, the inlet gas temperature of newly constructed gas turbines is typically as high as about 1,300° C., a level far exceeding the upper temperature limit of heat-resistance super alloys. Therefore, the temperature of the blades of the turbine 11 has to be lowered by some means to the upper temperature limit of the heat-resistant super alloy of which they are made. In the case of gas turbines having an inlet gas temperature of about 1,300° C., the blades are typically cooled by part of the air expelled from the compressor 13.

However, Air-cooling systems using air as cooling medium intrinsically show a rather poor effect. Therefore, cooling air has to be made to flow at a remarkably high rate to cool the blades of the turbine if the inlet gas temperature rises above 1,300° C. Further more, the convection cooling inside the blades alone cannot achieve a sufficient cooling effect and a film cooling technique of blowing out cooling air through pores arranged on the surface of the effective area of each blade has to be used as supplementary means.

The use of a film cooling technique is accompanied by a problem of reduced temperature of main stream gas as the blown out cooling air and the main stream gas are mixed with each other. This means that the combustor 14 has to be designed so as to withstand a higher outlet temperature and, at the same time, suppress the emission of NOx gas at such high temperature. If these design requirements are met, the combustor 14 consumes air and fuel at an enhanced rate.

As discussed above, the gas turbine having an air cooling system of a combined cycle power plant is inevitably accompanied by the problem of reduced thermal efficiency, which by turn reduces the overall thermal efficiency of the plant. Additionally, the pores on the surface of the blades can become clogged when low quality fuel containing impurities is used so that the plant has to be sensitive about the fuel it consumes in order to avoid the use of low quality fuel.

Japanese Patent Publication No. 63-40244 and Japanese Patent Application Laid-Open No. 4-124414 disclose techniques of using steam whose specific heat is twice as large as that of air as cooling medium in a gas turbine in order to bypass the above identified problems. With any of the proposed techniques, part of the steam to be used for the steam turbine of a combined cycle power plant is made to flow through the cooling duct arranged in the blades of the gas turbine to cool the blades and, after cooling the blades, put back to the remaining steam that is being fed to the steam turbine.

A combined cycle power plant realized by applying such a technique consumes steam at a rate far below the air consumption rate of a comparable plant that does not use the technique and achieves a desirable cooling effect without blowing out steam through the blades of the gas turbine. The steam used for cooling the blades is collected and roused to drive the steam turbine. Thus, the use of such a technique can effectively prevent any significant temperature fall in the main stream gas and a rise in the consumption rate of fuel and air within the combustor to improve the overall thermal efficiency of the plant. Additionally, the gas turbine can be adapted to low quality fuel.

However, in any known combined cycle power plants designed to cool the blades of the gas turbine with steam by allowing part of the steam for the steam turbine to flow through the cooling duct arranged in the gas turbine blades and thereafter to be combined with the remaining steam, the two parts of steam are actually put together at the inlet of the steam turbine before fed to it so that it is rather difficult to accurately control the steam flow rate, the steam pressure and the steam temperature to get to respective target values at the inlet of the steam turbine and achieve a maximum thermal efficiency for the plant.

Japanese Patent Application Laid-Open No. 6-93810 proposes a technique of dissolving this problem by returning substantially the entire steam that has passed through the cooling duct to the heating region of the steam cycle system.

While a combined cycle power plant realized by applying such a technique can control the steam flow rate, the steam pressure and the steam temperature to get to respective target values at the inlet of the steam turbine, the obtainable temperature rise of the steam collected after cooling the blades is 50 to 200° C. at most and the steam still can be used for cooling, revealing that the effective use of heat in the plant is not maximized yet.

As discussed above, any known combined cycle power plants still have problems to be solved in terms of the effectiveness of cooling the gas turbine system and the efficiency of collecting waste heat from the gas turbine system. Therefore, there exists a demand for combined cycle power plants having an improved overall thermal efficiency achieved by solving the above identified problems.

In a combined cycle power plant of the type under consideration, scaly debris contained in the steam passing through the cooling duct of the turbine blades of the gas turbine system can be deposited in the duct to reduce the cooling efficiency of the steam and the efficiency of collecting waste heat of the plant. This problem of undesired deposits of scaly debris by turn imposes limitations to the profile and the cross section of the cooling duct of the turbine blades to suppress the attempt for improving the cooling efficiency and the efficiency of collecting waste heat.

SUMMARY OF THE INVENTION

In view of the above identified problems, it is therefore the object of the present invention to provide a combined cycle power plant that can further improve the efficiency of cooling the gas turbine system of the plant and that of collecting waste heat in the plant.

According to a most remarkable characteristic feature of the invention, the above object is achieved by providing a combined cycle power plant comprising a turbine cooling system for cooling the gas turbine by causing the steam coming from the steam cycle system to flow through the gas turbine system. The turbine cooling system is so configured as to cause steam to flow through two or more than two elements of the gas turbine system such as the turbine blades and the combustor.

According to this characteristic feature of the present invention, the elements of the gas turbine are effectively cooled by the steam coming from the steam cycle system to allow gas with an ever higher temperature to be fed to the gas turbine system to improve the thermal efficiency of the gas turbine system.

According to this characteristic feature of the present invention, the efficiency of collecting waste heat from the gas turbine system is improved by the steam flowing through the turbine cooling system to consequently enhance the overall thermal efficiency of the plant.

This characteristic feature of the present invention is realized as a result of careful studies on the cooling system involving the use of steam and the system of collecting waste heat in existing combined cycle power plants of the type under consideration. According to the studies and analysis of the inventors of the present invention, the steam collected after cooling the blades of the gas turbine of any known combined cycle power plant shows a temperature rise of 50 to 200° C. at most, evidencing that the cooling potential of the steam is exploited only partly.

Therefore, the efficiency of cooling the gas turbine can be improved to allow the use of higher temperature gas by effectively exploiting the cooling potential of the steam coming from the steam cycle system of any known combined cycle power plant. Then, the efficiency of collecting waste heat from the gas turbine system is accordingly improved to enhance the overall thermal efficiency of the plant.

As discussed above, according to the characteristic feature of the present invention, the cooling potential and the waste heat collecting potential of the steam coming from the steam cycle system of a combined cycle power plant can be effectively exploited by causing the steam to circulate through two or more than two elements of the gas turbine system such as the turbine blades and the combustor. According to a series of experiments conducted by the inventors of the present invention, the cooling potential and the waste heat collecting potential of the steam coming from the steam cycle system cannot be fully exploited if the steam is caused to flow through a single element of the gas turbine system such as the turbine blades of a single row.

More specifically, according to the characteristic feature of the present invention, steam is made to flow through a plurality of elements of the gas turbine system such as the turbine blades of a plurality of rows or the turbine blades of a single row and the combustor to fully exploit the cooling potential and the waste heat collecting potential of the steam coming from the steam cycle system and improve the entire thermal efficiency of the combined cycle power plant.

The turbine cooling system through which steam flows typically comprises a cooling duct connecting a plurality of elements to be cooled either in series or in parallel. If it comprises a cooling duct connecting a plurality of elements to be cooled in parallel, steam flows through each of the element at a reduced flow rate to fully exploit the cooling potential and the waste heat collecting potential of the steam coming from the steam cycle system.

According to another characteristic feature of the present invention, there is provided a dust removing apparatus for cleansing the steam extracted from the steam cycle system of a combined cycle power plant to prevent scaly debris from being deposited on the inner surface of the cooling duct running through the turbine blades of the gas turbine and the combustor and hence any possible reduction in the efficiency of exploiting the cooling potential and the waste heat collecting potential of the steam coming from the steam cycle system. Additionally, since scaly debris are prevented from depositing on the surface of the cooling duct, the latter is not subjected to design limitations in terms of profile and cross section and hence a cooling duct having a high cooling effect can be designed for the purpose of the invention.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention and, together with the general description given above and the detailed description of the preferred embodiments given below, serve to explain the principles of the invention.

FIG. 17 is a schematic block diagram of a thirteenth embodiment of combined cycle power plant according to the invention.

DETAILED DESCRIPTION OF THE PREFERRED EMBODIMENTS

Figure 1:
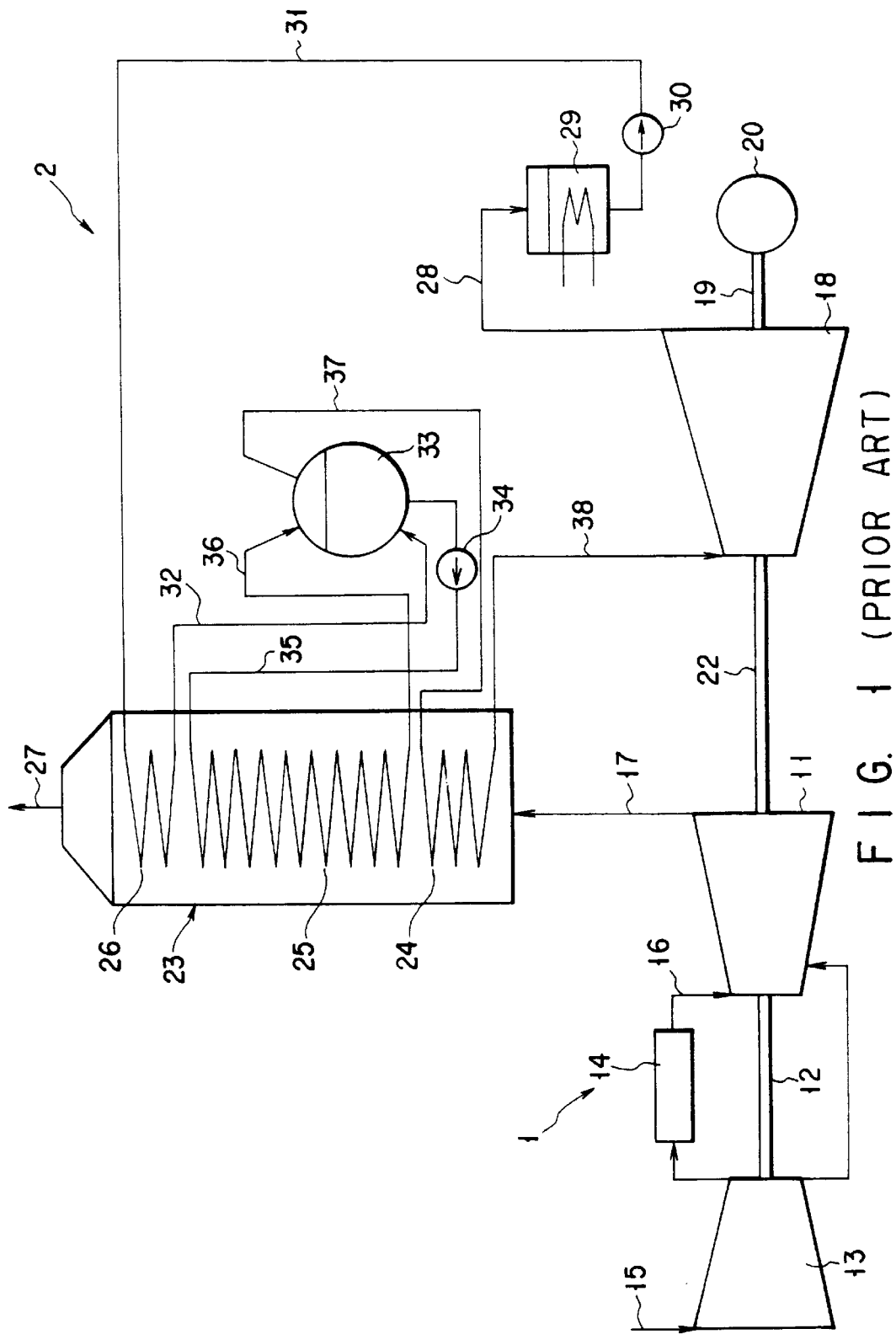
FIG. 1 is a schematic block diagram of a known combined cycle power plant.

Firstly, a first embodiment of combined cycle power plant according to the invention will be described by referring to FIGS. 2 through 6 of the accompanying drawings.

The embodiment of combined cycle power plant comprises a gas turbine system 41, a steam cycle system 42 having a steam turbine driven by the exhaust energy of the gas turbine system 41 and a gas turbine cooling system 43 for cooling the blades and a peripheral area of the combustor of the gas turbine by means of part of the steam of the steam cycle system 42.

The gas turbine system 41 includes a gas turbine 111, a compressor 113 coupled with the gas turbine 111 by way of a shaft 112 and a combustor 114 that receives compressed air and fuel from the compressor 113 and burns the fuel to produce hot high pressure gas for driving the gas turbine 111.

The compressor 113 compresses the ambient air fed in through an air duct 115 and the compressed air is led to the combustor 114. The combustor 114 burns the fuel fed from a fuel supply system (not shown), using the compressed air as combustion sustaining gas. The hot gas obtained by combustion is then fed to the gas turbine 111 by way of a combustion gas duct 116 and allowed to inflate to drive the gas turbine 111 before flowing out through an exhaust gas duct 117.

On the other hand, the steam cycle system 42 comprises a steam turbine 118 and an electric generator 120 coupled with the steam turbine 18 by means of a shaft 119. A steam cycle is established in the steam cycle system as it generates steam by the waste heat of the gas turbine system 41 and the generated steam is used to drive the steam turbine 118. Note that the rotor of the steam turbine 118 and that of the gas turbine 111 are linked by a shaft 122 in FIG. 2.

The steam cycle system 42 is additionally provided with a waste heat collector boiler 123 for collecting heat from the exhaust gas of the gas turbine 111 fed through the exhaust gas duct 117 and generating hot high pressure steam necessary for driving the steam turbine 118. The exhaust gas from the waste heat collector boiler 123 is then emitted into the atmosphere by way of a flue 127. A high pressure superheater 125, a second high pressure evaporator 126, a first high pressure evaporator 127 and a high pressure preheater 128 are arranged in the waste heat collector boiler 123 in the above mentioned order from the upstream side toward the downstream side thereof. These heaters and the steam turbine 118 are connected with each other in a manner as described below to establish a steam cycle 42.

The steam expelled from the steam turbine 18 is led to a steam condenser 130 by way of an expelled steam duct 129 and reduced to water at room temperature. The collected room temperature water is led to the high pressure preheater 128 by way of a circulation pump 131 and a circulation conduit 132 for preliminary heating and then to a high pressure drum 134 by way of a conduit 133 leading to the drum. The pressurized water in the high pressure drum 134 is led to the first high pressure evaporator 127 by way of another circulation pump 135 for evaporation and the produced hot high pressure steam is returned to an upper space of the high pressure drum 134 by way of a return duct 136. The returned steam is then fed to the high pressure superheater 125 by way of a steam duct 137, a flow junction 138 and a steam duct 139 for reheating and the heated steam is further fed to the steam turbine 118 by way of a steam supply duct 140.

On the other hand, the gas turbine cooling system 43 has the following configuration.

Part of the pressurized water in the high pressure 134 is fed to the second high pressure evaporator 126 by way of a pressurized water supply pump 141 and pressurized water supply conduits 142, 145 for evaporation and the produced hot high pressure steam is then fed by way of a steam duct 146 to two elements to be cooled of the gas turbine system that are connected in series, namely the cooling duct 150 formed in the blades 149 and a cooling section 160 arranged in a peripheral area of the combustor 114. Then, after passing the two elements to be cooled, the steam is made to flow through a steam duct 151 and put together with the steam coming from the high pressure drum 134 at the flow junction 138. Although not shown in FIGS. 2 through 6, the steam piping of the embodiment may be provided with one or more than one flow rate control valves, one or more than one bypass valves and one or more than one steam check valves.

After passing through the elements to be cooled, as described above, the steam is made to flow through a steam duct 151 and put together with the steam coming from the high pressure drum 134 at the flow junction 138.

There is also provided a cooling steam duct 161, through which the high pressure air generated by the compressor 113 of the gas turbine system 41 may be fed to a dust removing apparatus 170 as regenerating air by way of an air duct 163 and an air valve 168.

The high pressure air passing through the dust removing apparatus 170 can be fed to an exhaust gas duct 117 by way of a exhaust duct 164, an air valve 166 and a gas turbine exhaust duct A.

While not shown in FIGS. 2 through 6, the steam piping of the embodiment may be provided with one or more than one flow rate control valves, one or more than one bypass valves and one or more than one steam check valves.

With the above arrangement, the dust and debris contained in the steam being fed by way of the steam duct 146 can be trapped, at least partly, before the steam passes through the elements to be cooled and the steam duct can be blocked by the steam valves 165 and 167.

Additionally, the scaly debris and dust adhering to the dust removing apparatus 170 can be removed to regenerate the apparatus by causing the high pressure air from the compressor 113 to flow through the dust removing apparatus 170 by way of the air valves 166 and 168 in the direction opposite to that of the flow of steam.

Figure 2:
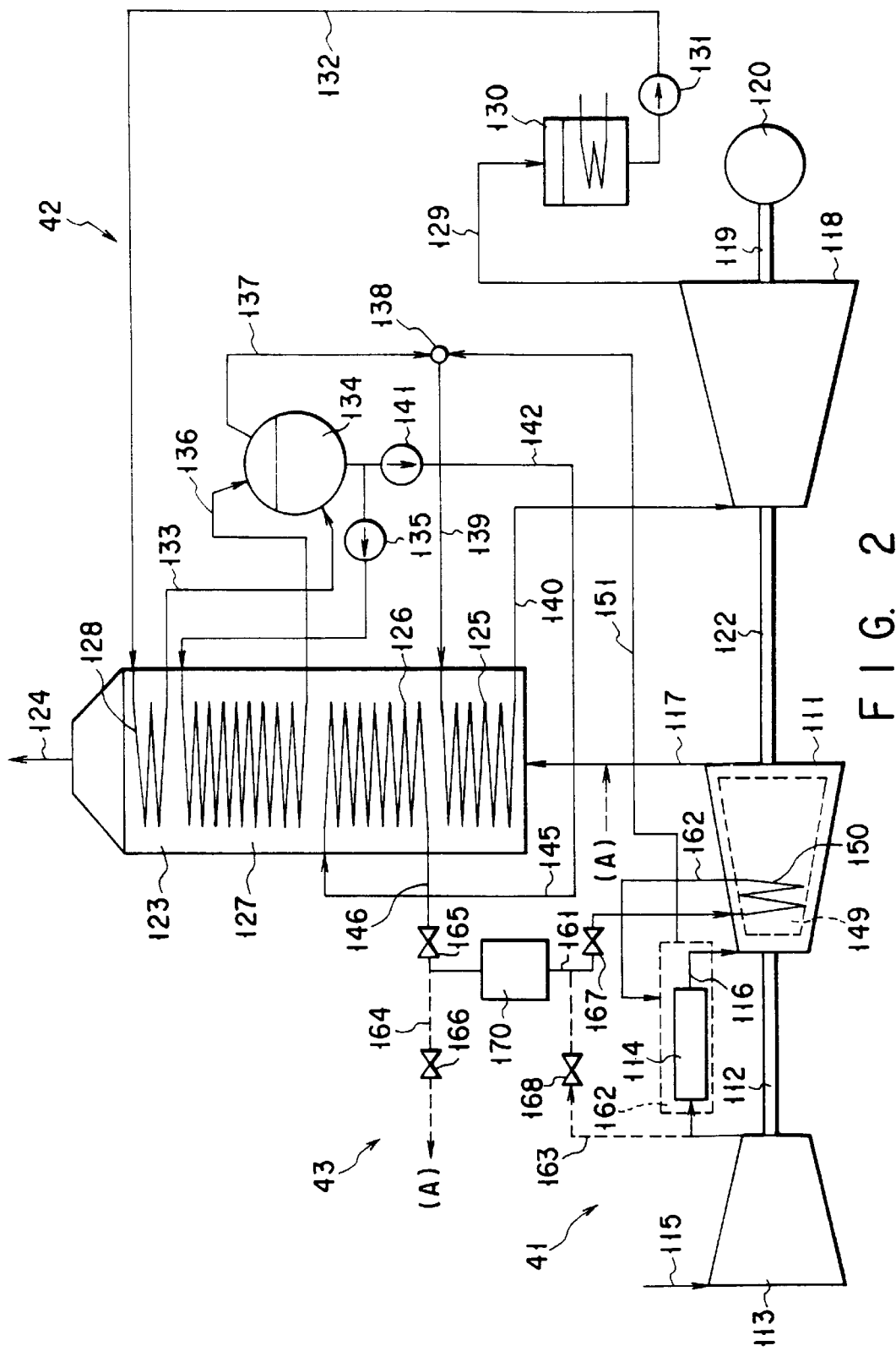
FIG. 2 is a schematic block diagram of a first embodiment of combined cycle power plant according to the invention.
Figure 3:
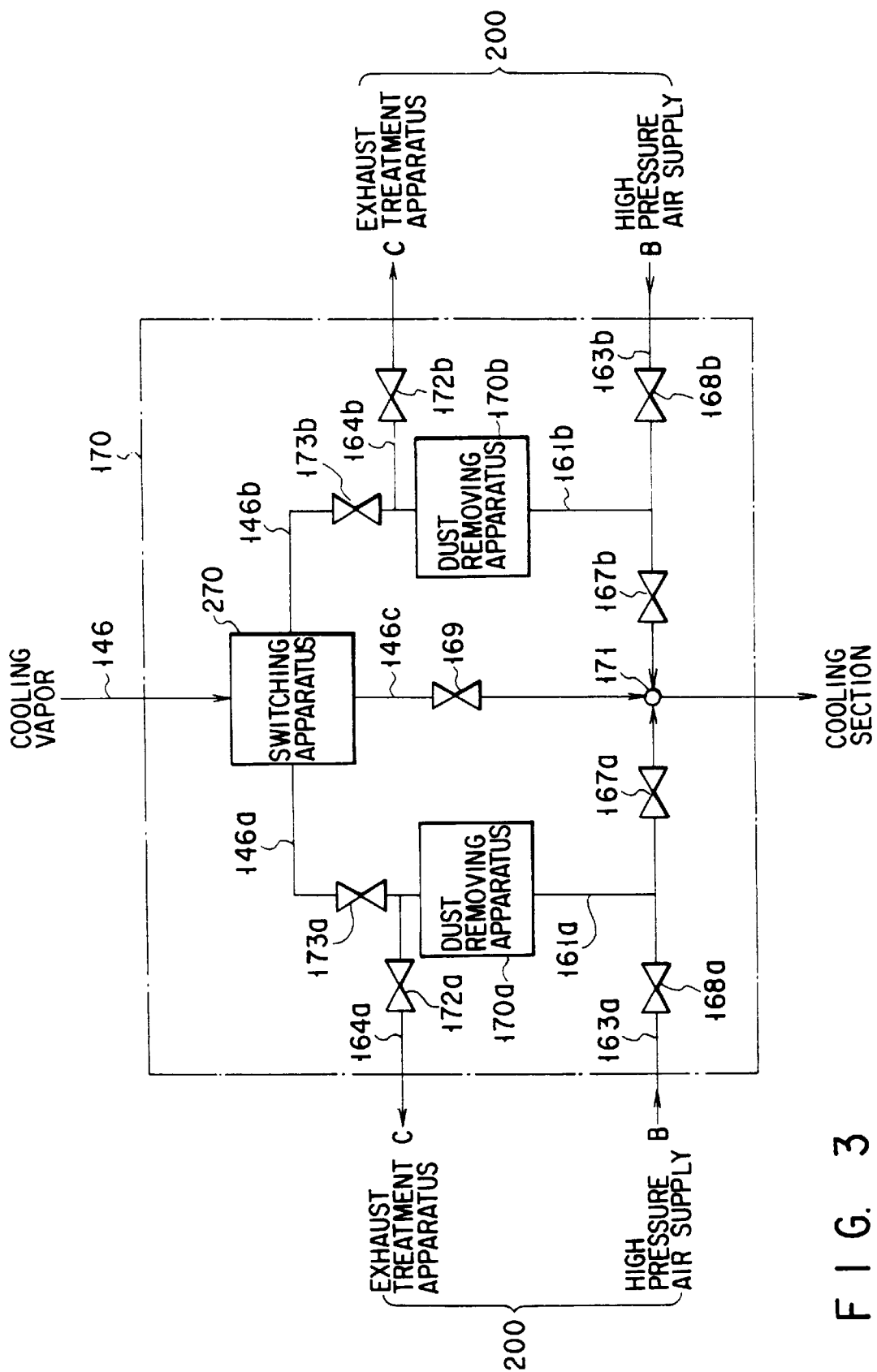
FIG. 3 is a schematic block diagram of a dust removing apparatus that can be used for the first embodiment of combined cycle power plant according to the invention.

FIG. 3 is a schematic block diagram of the dust removing apparatus 170 of FIG. 2. The steam duct 146 is provided near the downstream end thereof with a steam switching device 270 comprised of a valve mechanism and then divided into two branch ducts 146a and 146b provided with respective dust removing units 170a and 170b. A third branch duct 146c that is not provided with a dust removing unit is also arranged between the above two branch ducts.

The dust removing units 170 and 170b are provided at the upstream and downstream sides thereof respectively with steam valves 173a and 173b and 167a and 167b before the two branch ducts are put together by way of respective steam ducts 161a and 161b at a flow junction 171, from which steam is further fed to a steam cooling section.

On the other hand, a collection system 200 is added to the dust removing apparatus for regenerating the latter. The collection system 200 is comprised of high pressure air feed-in ducts 163a and 163b connected respectively to the upstream sides of the valves 167a and 167b of the steam ducts 161a and 161b arranged downstream relative to the respective dust removing units 170a and 170b and provided with respective valves 168a and 168b for receiving air from a high pressure air source B and treated air discharge ducts 164a and 164b connected respectively to the downstream sides of the valves 173a and 173b of the steam ducts 146a and 146b arranged upstream relative to the respective dust removing units 170a and 170b and provided with respective valves 172a and 172b for discharging air to an exhaust treatment apparatus C.

The valves 167a, 167b, 168a, 168b, 172a, 172b, 173a and 173b, of the steam ducts 146a, 146b, 161a and 161b, the high pressure air feed-in ducts 163a and 163b and the treated air discharge ducts 164a and 164b can be manually operated to selectively open or close any of them.

In the collecting system 200 having the above described configuration, either one of the dust removing units 170a and 170b is made to allow steam to flow therethrough as the cooling medium of the gas turbine cooling system 43 by means of the steam switching device 270 when the plant is in operation. If, for example, the right side dust removing unit in FIG. 3, or the unit 170b, is operated, the valves 173b and 167b of the steam ducts 146b and 163b of the dust removing unit 170b are opened whereas the valves 168b and 172b of the high pressure air feed-in duct 163b and the treated air discharge duct 164b are closed.

Then, the right side dust removing unit in FIG. 3, or the unit 170b, allows steam to flow therethrough to remove dust from the steam operating for cooling the gas turbine.

On the other hand, in the left side dust removing unit in FIG. 3, or the unit 170a, whose operation is suspended, the valves 173a and 167a of the steam ducts 146a and 161a are closed whereas the valves 168a and 172b of the high pressure air feed-in duct 163a and the treated air discharge duct 164a are opened.

Then, the left side dust removing unit, or the unit 170a, causes high pressure air to flow in the direction opposite to that of air flow for dust removing operation in order to remove the dust trapped in the dust removing unit 170a and regenerate the latter.

When the operating dust removing unit 170b gets to a stage where it needs cleansing, the switching device 270 is operated to change the course of flowing steam and the valves are reversely operated to switch the operation of removing dust in the steam and that of regenerating the dust removing apparatus between the dust removing units 170a and 170b.

With the above arrangement, the dust removing units 170a and 170b are operated respectively for dust removal and for regeneration or vice versa on a constant basis so long as the turbine cooling system is held in operation.

The steam duct 146c having a switch valve 169 is arranged to bypass the dust removing apparatus when the components of the turbine cooling system is serviced or in an emergency case. Thus, steam may be made to flow through the steam duct 146c whenever necessary.

While the air supply source of the above embodiment is the compressor 113 of the gas turbine system 41, air may alternatively be supplied from any source other than the compressor 113. The means for regenerating the dust removing apparatus is not limited to compressed air and any other material such as chemical solvent may alternatively be used for the purpose of the invention. The flow route of the regenerating means is not limited to the above description and any other appropriate route may be arranged for the purpose of the invention.

The steam guided through the duct 146 is made to flow through the cooling duct 150 of the blades 149 and the cooling section 160 in a peripheral area of the combustor 114 of the gas turbine connected in series and constituting two elements to be cooled in order to cool them. All or part of the steam used for the cooling operation is collected by the duct 151 and hence the collected steam is never mixed with the main stream gas to lower the temperature of the latter so that any unduly but necessary increase of the rate of feeding fuel and air to the combustor 114 can be prevented to increase the thermal efficiency of the plant.

Since two elements of the gas turbine system are serially cooled, the cooling potential of steam can be maximally exploited. Additionally, since the liner and the tail cylinder of the combustor 114 are also cooled by steam, any unduly but necessary increase in the air supply can also be prevented. Still additionally, since the blades of the gas turbine is constructed so as to be mostly cooled by conventional air, the gas turbine system is adapted to low quality fuel.

Furthermore, the specific output of the above embodiment can be remarkably raised. Still additionally, the cooling steam can be partly injected into the combustor as means for reducing the rate of NOx generation in the combustor 114 and/or discharged from the surface of the turbine blades for film cooling.

The steam passing through the gas turbine cooling system 43 of the above embodiment is then brought to the junction 138 by way of the steam duct 151 and put together with the steam coming from the high pressure drum 134 in the heating region of the steam cycle system 42. Then, the steam from the junction is heated again by the high pressure superheater 125 before fed to the steam turbine 118 so that the flow rate, the pressure and the temperature of the steam passing through the inlet of the steam turbine 118 can be made to get to the respective target values without being undesirably influenced by the gas turbine cooling system 43 and hence the steam turbine system can be operated with a maximum thermal efficiency.

Since cooling steam is made to flow from the gas turbine to the steam turbine in any known combined cycle power plant, the operation of the steam turbine can become unstable when the load of the steam turbine and the steam temperature fluctuate. However, to the contrary, the above embodiment is free from such a problem and, since the steam is returned to the drum, the embodiment can be operated with a partial load by appropriately selecting the level of the pressure to be applied to the drum.

Figure 6:
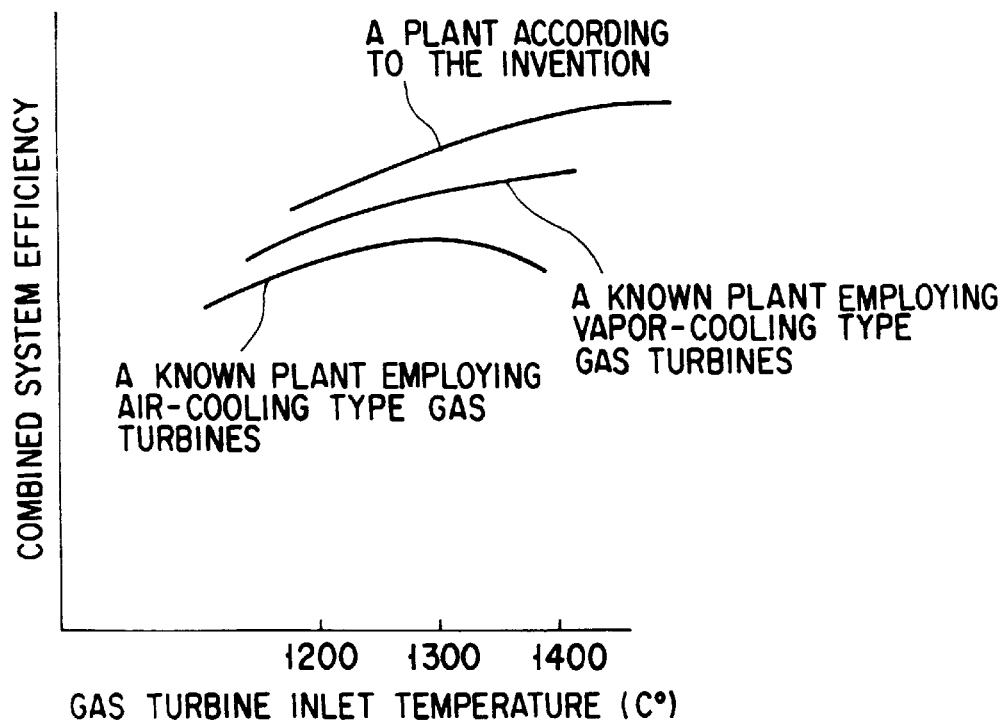
FIG. 6 is a graph illustrating the relationship between the combined system efficiency and the gas turbine inlet temperature of the first embodiment of combined cycle power plant according to the invention.

FIG. 6 is a graph showing the overall efficiency of the above embodiment of combined cycle power plant according to the invention and that of a known combined cycle power plant in comparison. The embodiment of combined cycle power plant according to the invention illustrated in FIG. 2 can improve the thermal efficiency of the steam turbine system to remarkably improve the overall thermal efficiency of the plant particularly in a high temperature region for the gas turbine inlet.

In the above embodiment, additionally, a dust removing apparatus 170 is arranged upstream relative to the gas turbine blades and other gas turbine components to be cooled by steam and designed to cleanse the upstream steam so that the advantages of the steam cooling method are not damaged and a desired cooling effect can be achieved at any time of operation throughout the service life of the combined cycle power plant.

Figure 5:
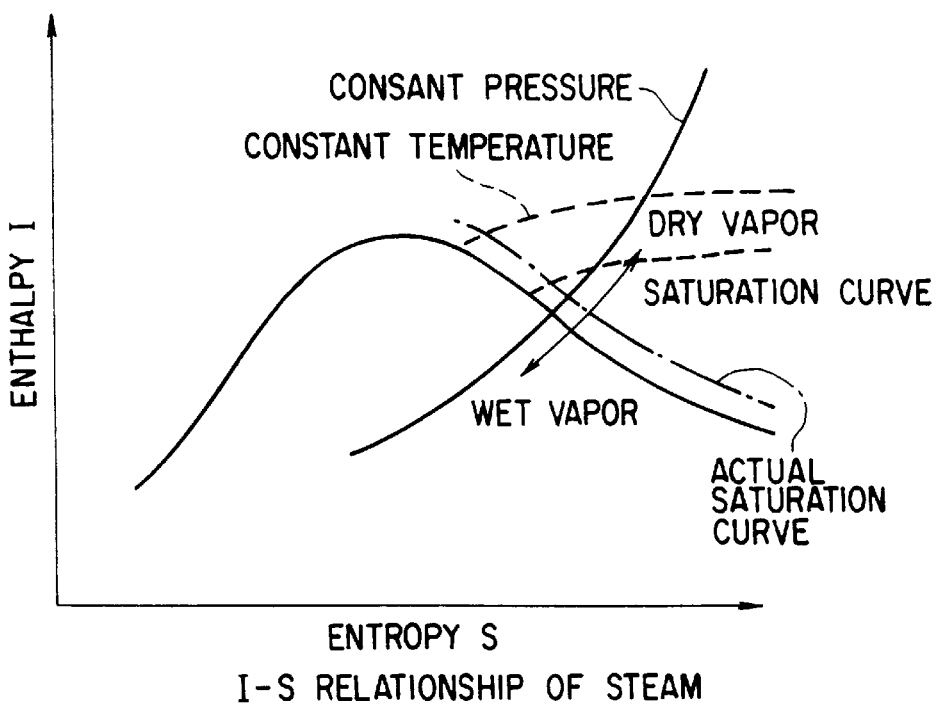
FIG. 5 is a graph illustrating the i–S relationship of steam that can be used for the purpose of the present invention.

Adhesion of scaly debris to the components of the turbine cooling system can be minimized by superheating the steam to be used for cooling operation by more than 10° C. Referring to FIG. 5 that illustrates the i–S relationship of steam, it is known that steam normally contains chemical substances to a slight extent and the saturation curve of any actual steam is slightly shifted to the high temperature side from that of pure steam. If the i–S curve crosses the saturation curve, steam is preferably used for cooling at temperature above the actual saturation curve illustrated by a dotted broken line because adhesion of scaly debris becomes remarkable in the wet area of the graph. The effect of preventing adhesion of scaly debris can be achieved by superheating the steam to be used for cooling operation by more than 10° C.

Figure 4:
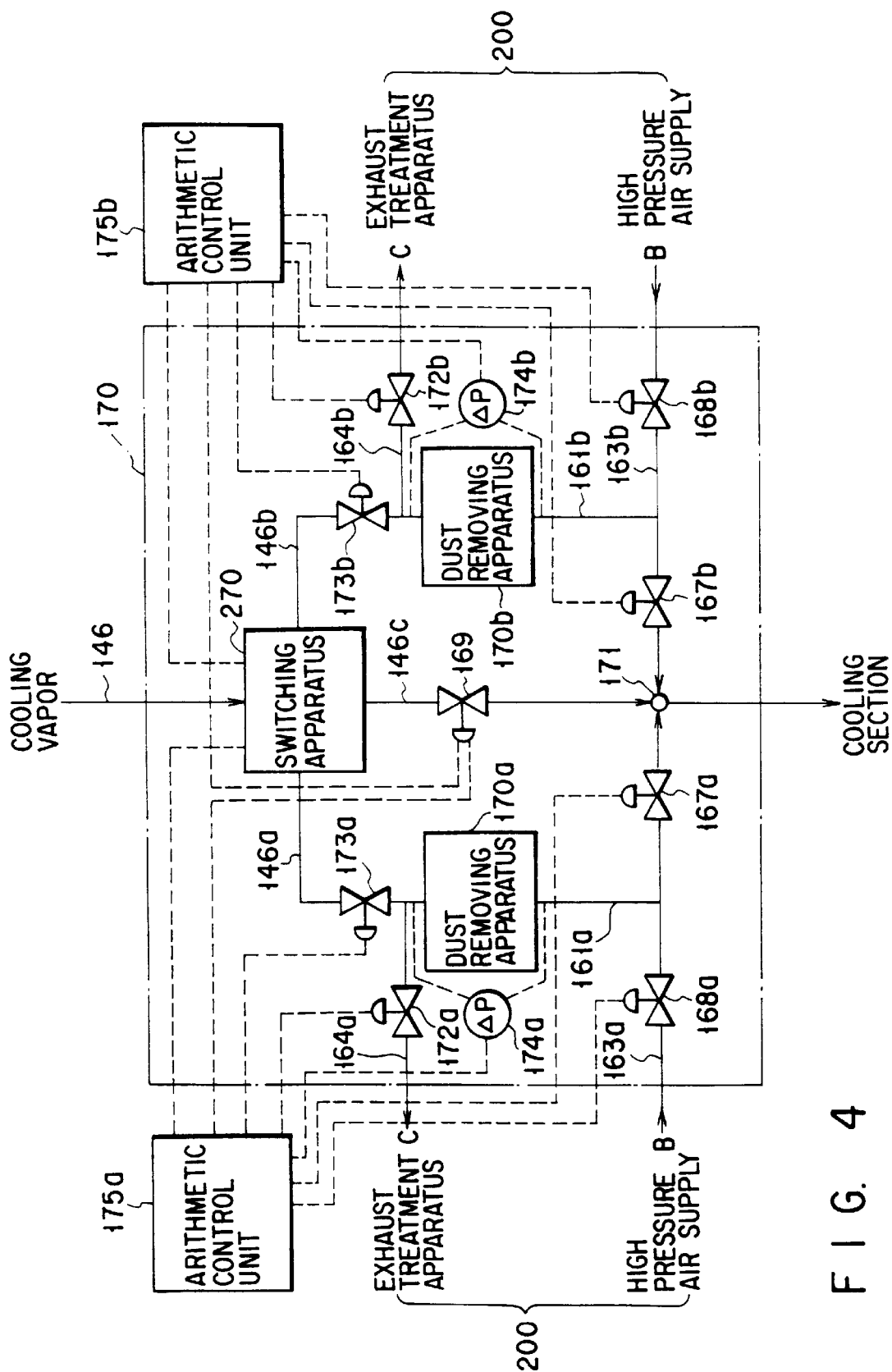
FIG. 4 is a schematic block diagram of another dust removing apparatus that can be used for the first embodiment of combined cycle power plant according to the invention.

FIG. 4 is a schematic block diagram of another dust removing apparatus that can be used for the first embodiment of combined cycle power plant according to the invention. This apparatus differs from that of FIG. 3 in that the collecting system 200 is automatically switched. The components of the apparatus of FIG. 4 that are same as or similar to those of FIG. 3 are denoted respectively by the same reference symbols and only the differences of the two apparatus will be described hereinafter.

The dust removing apparatus of FIG. 4 is provided with arithmetic control units 175a and 175b for controlling the valves 173a, 173b, 167a and 167b of the steam ducts and differential pressure transducers 174a and 174b for respectively detecting the pressure differences between the upstream and the downstream of the dust removing units 170a and 170b.

The signals generated by the differential pressure transducers 174a and 174b are read respectively by the arithmetic control units 175a and 175b so that the regenerating operation and the dust removing operation are automatically switched when the pressure difference between the upstream and the downstream of the dust removing units 170a or 170b, whichever appropriate, exceeds a predetermined level.

With the above arrangement, the combined cycle power plant is stable operated as the dust removing units 170a and 170b are automatically switched for dust removal and regeneration.

The above arrangement is also helpful when the turbines are started, stopped or operated with a partial load and a satisfactory supply of cooling steam is hardly achievable because part of the regenerating air can be us ed as cooling air and the water adhering to the steam ducts can be purged by air when the turbines a restarted or stopped.

Additionally, steam can be replaced by air or vice versa by operating the valves arranged on the steam ducts .

While two arithmetic control units 175a and 175b are used for controlling the valves in FIG. 4, the number of arithmetic control units to be used for the dust removing apparatus of a combined cycle power plant according to the invention may be varied depending on the number of dust removing units and other control units involved in the operation of the plant.

Thus, with the above arrangement, the gas turbine can be cooled effectively and scaly debris contained in the circulating steam can be effectively removed under various circumstances of the plant including the situation where the turbines are started, stopped or operated under a partial load to say nothing of normal operation periods. Additionally, the dust removing apparatus can be optimally regenerated.

Although not shown, the gas turbine cooling system may be provided with a switching device and so arranged that the cooling duct is separated from the steam cycle and made available for some other high pressure air supply source by operating the switching device or steam is supplied from some other steam engine to the gas turbine having elements to be cooled.

Figure 7:
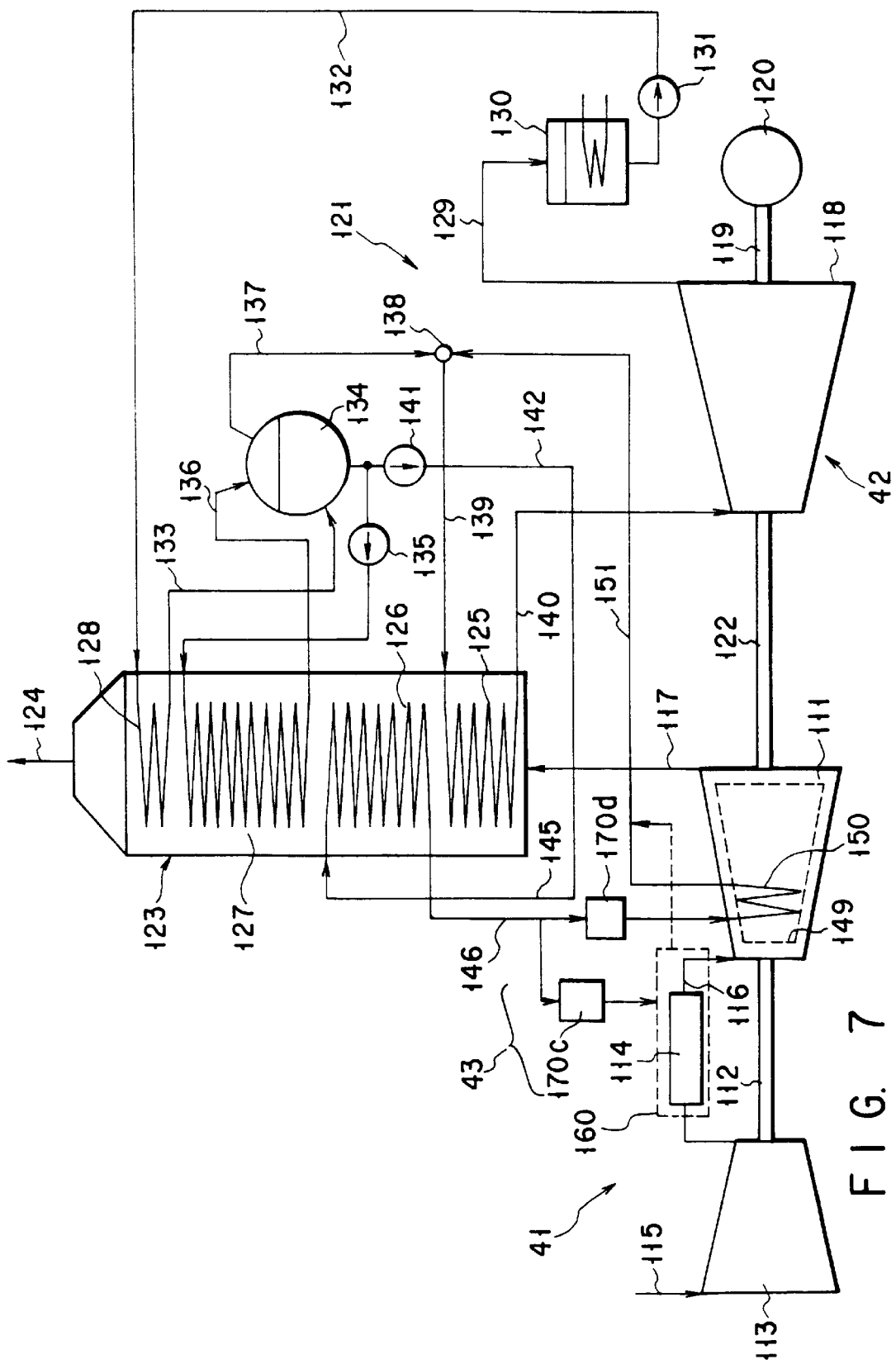
FIG. 7 is a schematic block diagram of a third embodiment of combined cycle power plant according to the invention.

FIG. 7 is a schematic block diagram of a third embodiment of combined cycle power plant according to the invention. In this embodiment, steam is supplied from the high pressure evaporator 126 to the turbine blades 149 and the cooling section 160 of the combustor 114 in parallel and dust removing units 170c and 170d are arranged respectively corresponding to the turbine blades 149 and the cooling section of the combustor. The dust removing units 170c and 170d are designed to cool the cooling section 160 of the combustor and the turbine blades 149 respectively and separately. With such an arrangement, the dust removing units 170c and 170d can be provided with different meshes in correspondence to the respective objects to be cooled to maximize their dust removing effect for a prolonged period of time.

Figure 8:
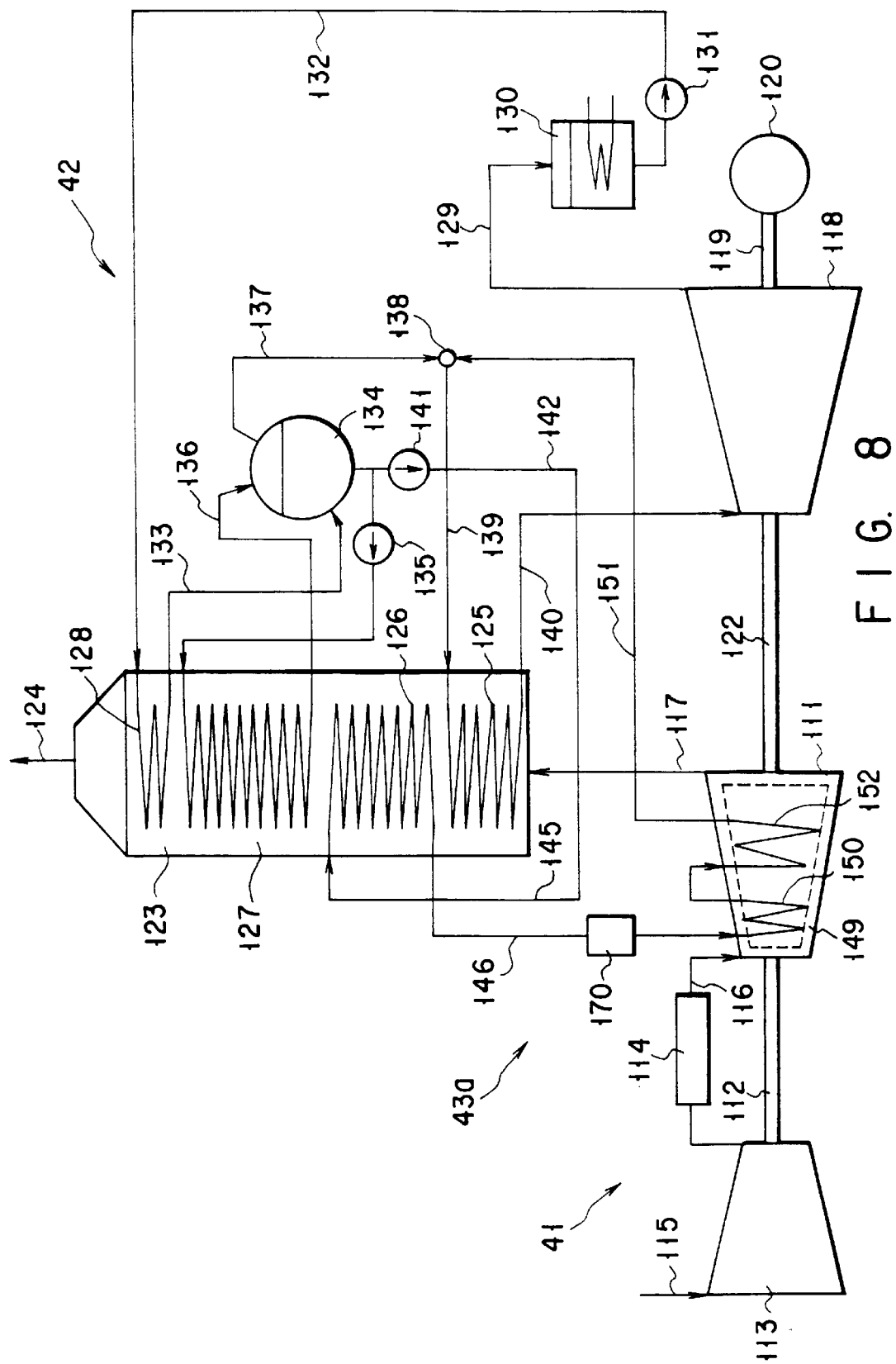
FIG. 8 is a schematic block diagram of a fourth embodiment of combined cycle power plant according to the invention.

FIG. 8 is a schematic block diagram of a fourth embodiment of combined cycle power plant according to the invention.

This embodiment differs from the embodiment of FIG. 2 in that a plurality of elements are cooled in the gas turbine cooling system 43a of this embodiment. More specifically, two rows of gas turbine blades 149 are provided with respective cooling ducts 150 and 158 and cooled by steam in the gas turbine cooling system 43a. Otherwise, this embodiment is identical with that of FIG. 2 and, therefore, the components of this embodiment that are same as or similar to those of FIG. 2 are denoted respectively by the same reference symbols and will not be described any further.

This embodiment is as effective as the first embodiment of FIG. 2 and additionally it can be adapted to multi-row gas turbines expected to appear in combined cycle power plants of the next generation.

Figure 9:
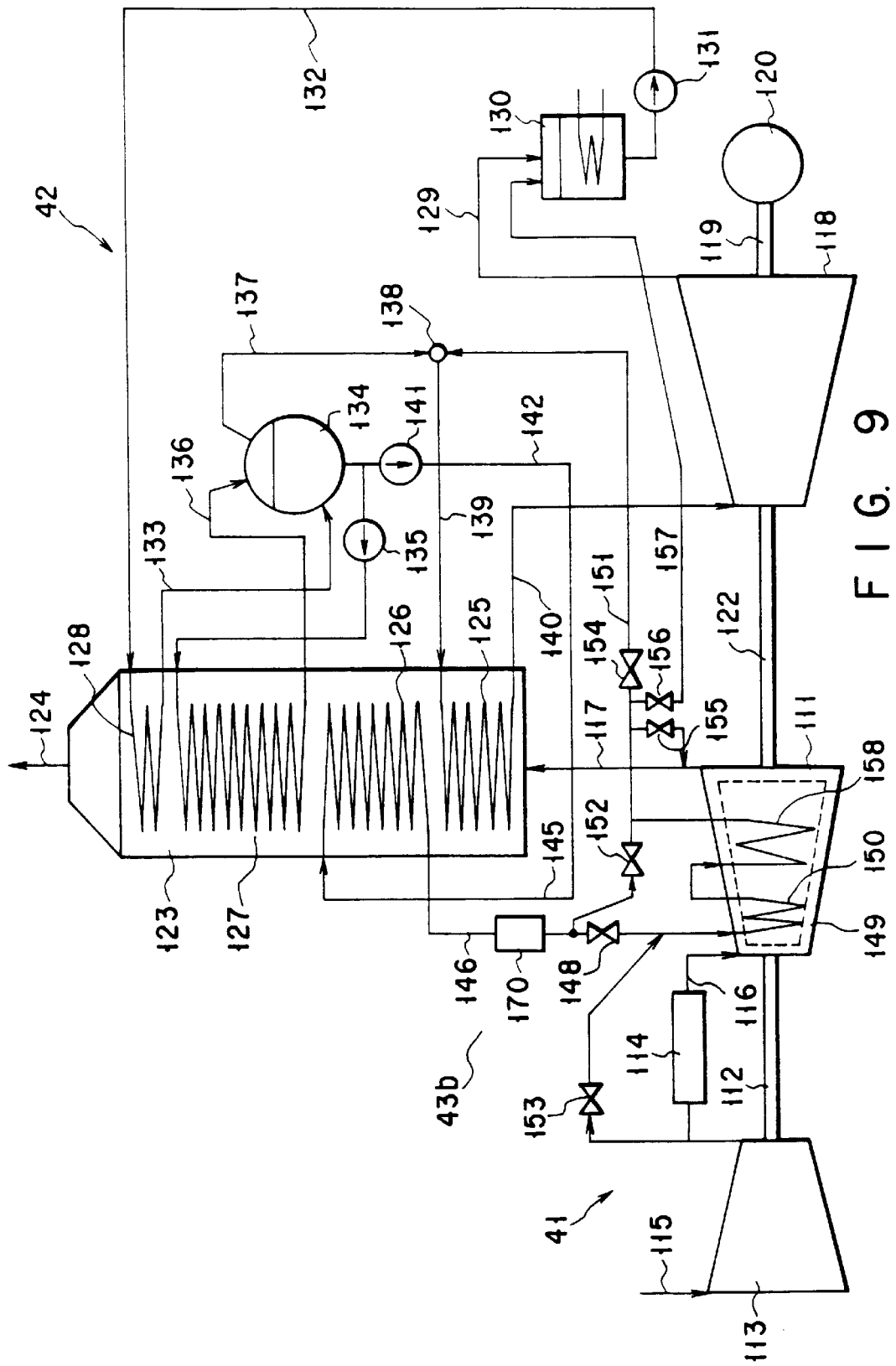
FIG. 9 is a schematic block diagram of a fifth embodiment of combined cycle power plant according to the invention.

FIG. 9 is a schematic block diagram of a fifth embodiment of combined cycle power plant according to the invention.

This embodiment is realized by slightly modifying the embodiment of FIG. 8 and differs from the latter in that two different elements are cooled by the gas turbine cooling system 43a. More specifically, in the gas turbine cooling system 43b of this embodiment, the portion of the duct located between a flow rate control valve 148 and the cooling duct 150 can be connected to the outlet of the compressor 113 by way of another flow rate control valve 153 and the portion of the duct located between the bypass valve 152 and the valve 154 can be connected to the exhaust gas duct 117 by way of a valve 155 and also to the steam condenser 130 by way of a valve 156 and a discharge duct 157. Otherwise, this embodiment is identical with that of FIG. 2 and, therefore, the components of this embodiment that are same as or similar to those of FIG. 2 are denoted respectively by the same reference symbols and will not be described any further.

This embodiment is as effective as the fourth embodiment of FIG. 8. In addition, it is helpful when the turbines are started, stopped or operated with a partial load and a satisfactory supply of cooling steam is hardly achievable from the second high pressure evaporator 126 because part of the air discharged from the compressor 113 can made to flow through the cooling ducts 150 and 152 as cooling air to cool the blades 149 and the water adhering to the steam ducts can be purged by air when the turbines are started or stopped.

More specifically, part of the high pressure air discharged from the compressor 113 can be made to flow through the flow rate control valve 153, the cooling ducts 150 and 158, the exhaust gas duct 117 and the exhaust duct 157 by "closing" the flow rate control valve 148, the bypass valve 152 and the valve 154 and "opening" the flow rate control valve 153 and the valves 155 and 156 so that the steam path can be isolated to cool the proper steam cooling section and purge the water lingering in the steam ducts. Additionally, steam can be replaced by air or vice versa by appropriately operating the valves in the steam ducts.

Thus, with the above described fifth embodiment, the gas turbine 111 can be effectively cooled by steam under various circumstances of the plant including the situation where the turbines are started, stopped or operated under a partial load to say nothing of normal operation periods. Although not shown, the gas turbine cooling system of the fifth embodiment may be provided with a switching device and so arranged that the cooling duct is separated from the steam cycle and made available for some other high pressure air supply source by operating the switching device or steam is supplied from some other steam engine to the gas turbine having elements to be cooled. Such an arrangement is as effective as any other arrangements described earlier.

Figure 10:
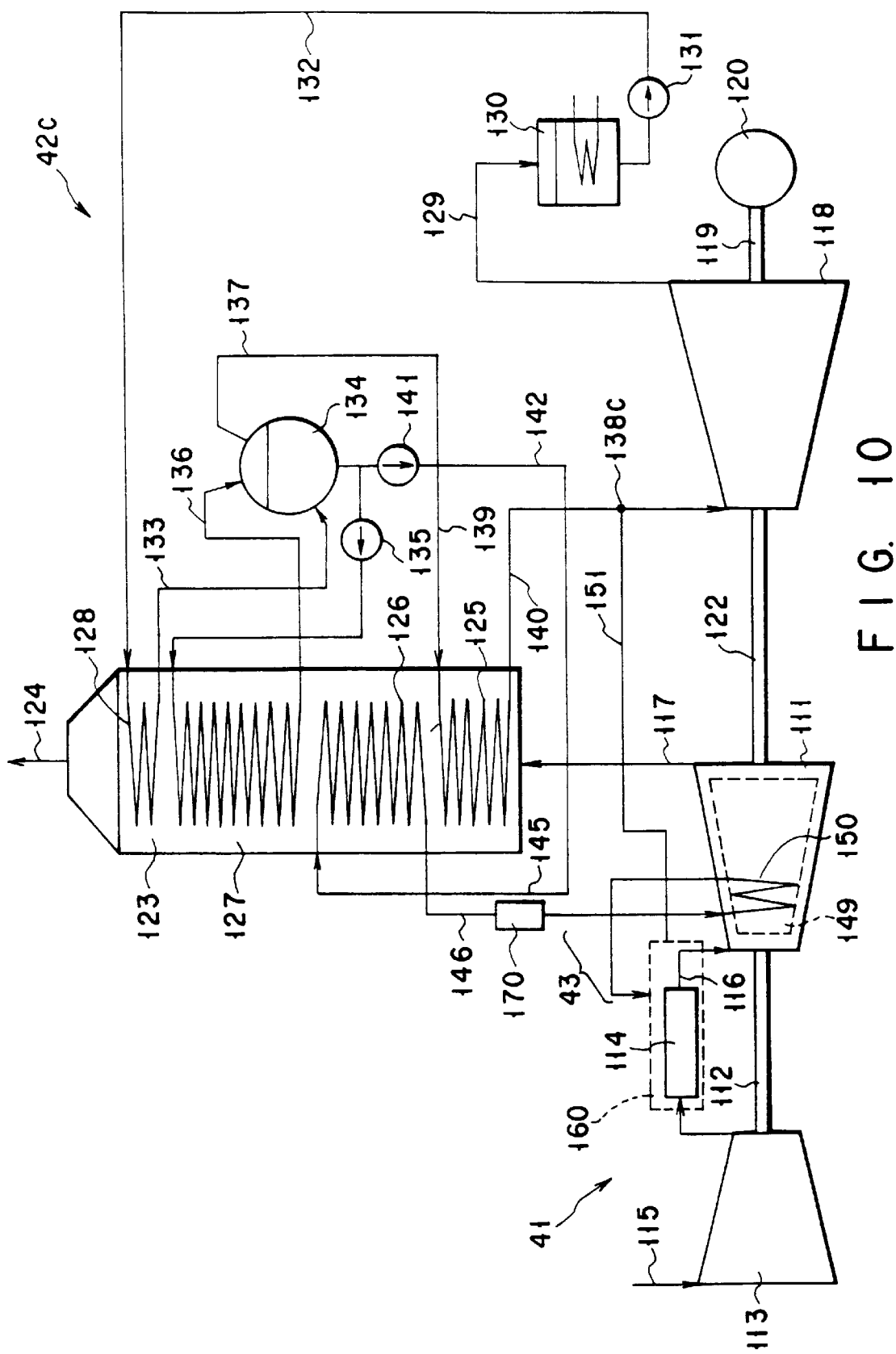
FIG. 10 is a schematic block diagram of a sixth embodiment of combined cycle power plant according to the invention.

FIG. 10 is a schematic block diagram of a sixth embodiment of combined cycle power plant according to the invention.

The sixth embodiment differs from the embodiment of FIG. 2 in terms of the configuration of the steam cycle system 121c. More specifically, in the steam turbine system 42c of this embodiment, the steam collected by way of the gas turbine cooling system 43 is then fed from the high pressure superheater 125 to another junction 138c on the way to the steam turbine 118 through the steam supply duct 140, which junction 138c is located at the end of the steam heating process. Otherwise, this embodiment is identical with that of FIG. 2 and, therefore, the components of this embodiment that are same as or similar to those of FIG. 2 are denoted respectively by the same reference symbols and will not be described any further.

With this arrangement again, the steam used to cool a plurality of elements of the gas turbine 111 is subjected to a sufficient heat exchanging operation and therefore does not need to go through the high pressure superheater 125 in the waste heat collector boiler 123 so that the combined cycle power plant can be made more compact with an improved overall thermal efficiency.

Figure 11:
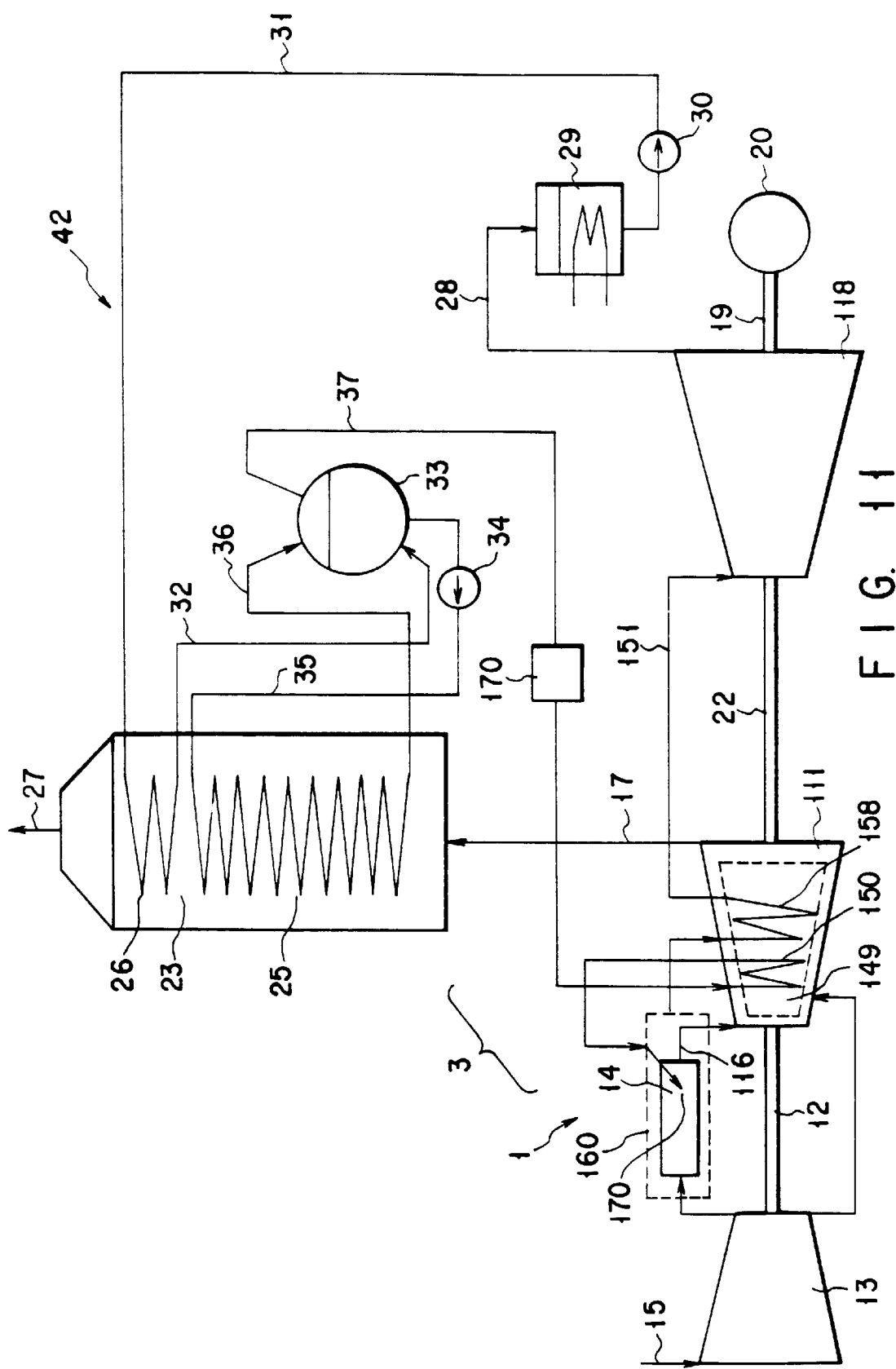
FIG. 11 is a schematic block diagram of a seventh embodiment of combined cycle power plant according to the invention.

FIG. 11 is a schematic block diagram of a seventh embodiment of combined cycle power plant according to the invention.

In this embodiment, all the steam generated by the high pressure drum 33 is made to pass through the duct 37, the cooling duct 150 of the gas turbine blades 149 to be cooled and the cooling duct 158 of the section 160 to be cooled by steam of a peripheral area of the combustor and of the gas turbine blades 149 to be cooled and, after cooling these elements, fed to the steam turbine 118 by way of the steam duct 151. Otherwise, this embodiment is identical with that of FIG. 2 and, therefore, the components of this embodiment that are same as or similar to those of FIG. 2 are denoted respectively by the same reference symbols and will not be described any further.

With this arrangement, the specific output of the above embodiment can be remarkably raised. Additionally, there is provided a steam injection device 170 by means of which the cooling steam can be partly injected into the combustor 14 as means for reducing the rate of NOx generation in the combustor 14 and/or discharged from the surface of the turbine blades for film cooling.

In this embodiment again, the steam used to cool a plurality of elements of the gas turbine 111 is subjected to a sufficient heat exchanging operation and therefore does not need to go through the high pressure superheater 25 in the waste heat collector boiler 23 so that the combined cycle power plant can be made more compact with an improved overall thermal efficiency.

While not shown, this seventh embodiment may be adapted to serial or parallel cooling of a plurality of elements of the gas turbine to be cooled by appropriately selecting the mode of supplying cooling steam.

Figure 12:
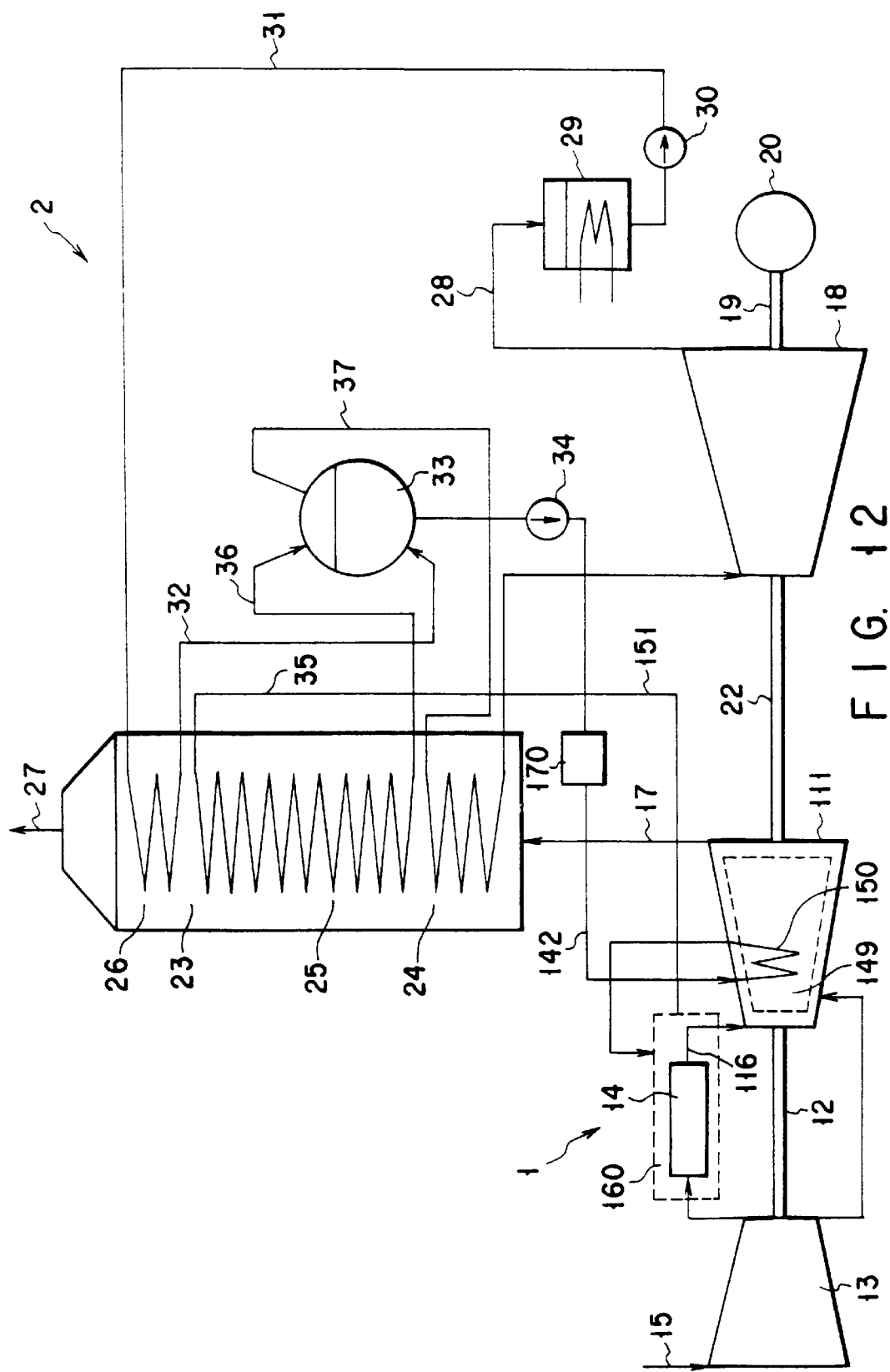
FIG. 12 is a schematic block diagram of an eighth embodiment of combined cycle power plant according to the invention.

FIG. 12 is a schematic block diagram of an eighth embodiment of combined cycle power plant according to the invention.

The embodiment of FIG. 12 is realized by combining the known plant of FIG. 1 and a plant according to the invention in an appropriate way.

More specifically, the pressurized water in the high pressure drum 33 is fed through the circulation pump 34 and the pressurized water conduit 142 to cool the cooling duct 150 formed in the gas turbine blades 149, one of the two serially connected elements to be cooled, and then the cooling section 160 in a peripheral area of the combustor 114, the other of the two elements.

After passing through the two elements to be cooled, the pressurized and heated water is fed to the high pressure evaporator 25.

This arrangement is particularly effective when a plurality of elements of the gas turbine are cooled by pressurized water.

Figure 13:
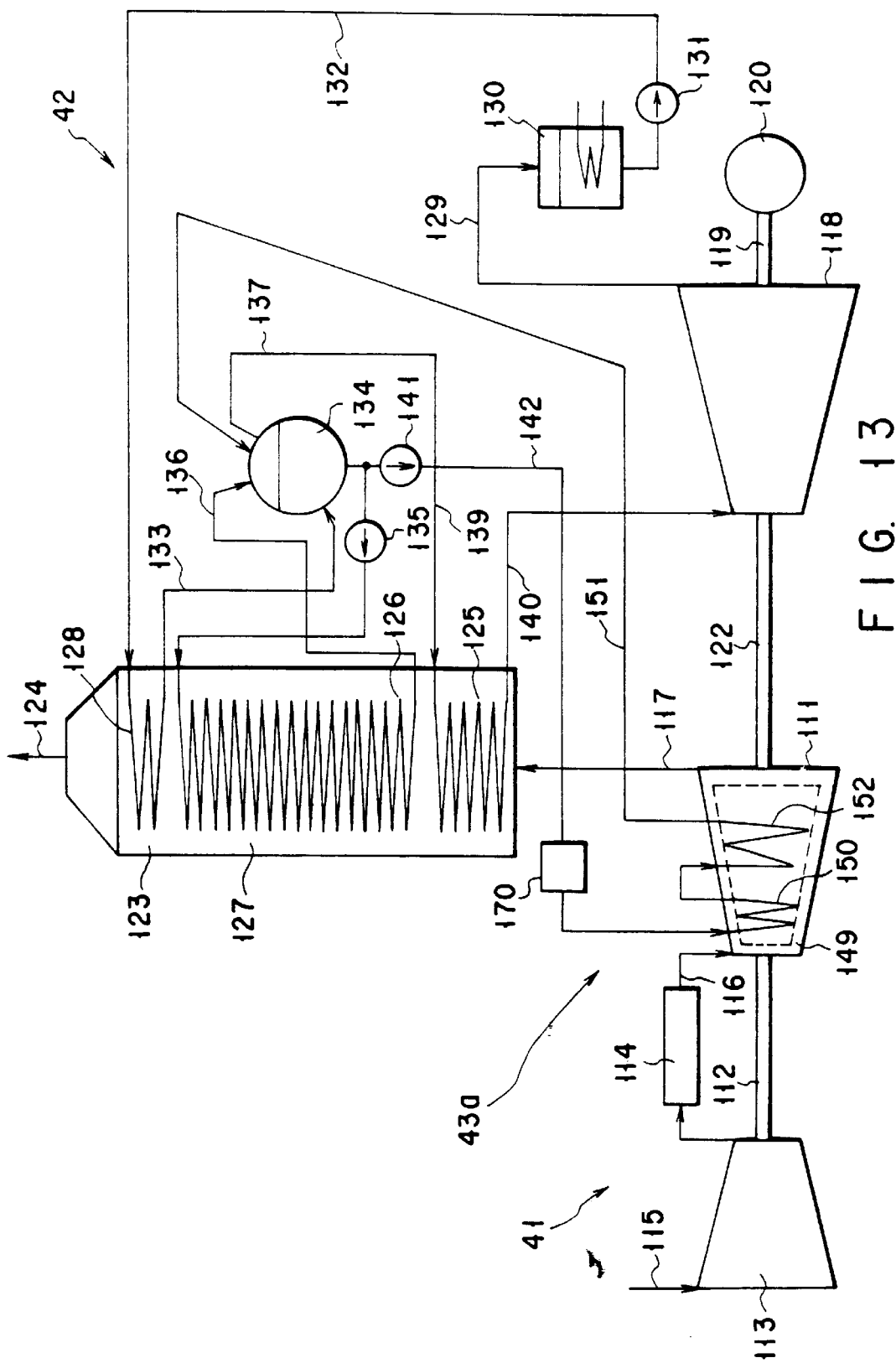
FIG. 13 is a schematic block diagram of a ninth embodiment of combined cycle power plant according to the invention.

FIG. 13 is a schematic block diagram of a ninth embodiment of combined cycle power plant according to the invention.

In this embodiment, the cooling ducts 150 and 152 and the collection duct 151 are led to the high pressure drum 134 so that the pressurized water passing through the duct 151 may partly be evaporated to produce liquid having both a gas phase and a liquid phase there. The effect of this embodiment may be enhanced when the collection conduit 151 is led to an upper portion of the high pressure drum 134.

Then, the fluid with a gas phase and a liquid phase is then divided into water and steam in the high pressure drum 134.

The fluid flowing through the collection duct 151 may alternatively have a single phase of gas or liquid.

Figure 14:
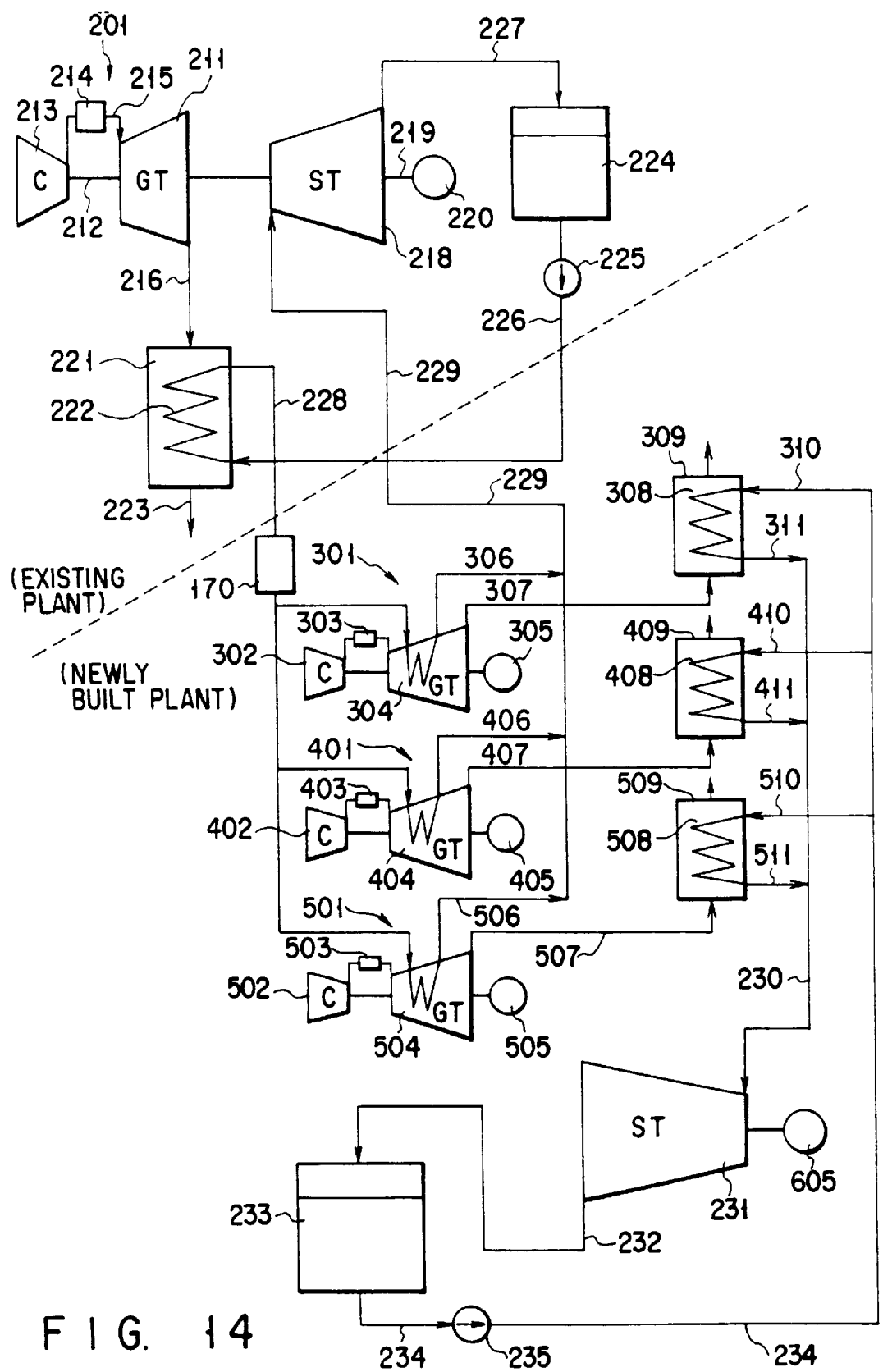
FIG. 14 is a schematic block diagram of a tenth embodiment of combined cycle power plant according to the invention.

FIG. 14 is a schematic block diagram of a tenth embodiment of combined cycle power plant according to the invention and comprising a gas turbine system having a plurality of gas turbines.

In this embodiment of combined cycle power plant, the steam generated in an existing conventional gas turbine plant 201 and a waste heat collector boiler 221 utilizing the waste heat of the gas turbine plant 201 is fed in parallel to independent gas turbine systems 301, 401 and 501 provided with respective steam cooling systems in order to cool the gas turbines. After passing through the cooling systems, the steam is fed to an aggregative steam conduit 229 by way of respective collector conduits 306, 406 and 506 and supplied to the steam turbine 218 to drive the latter.

After passing through the steam turbine 218, the steam is turned back to room temperature water by a steam condenser 224 and the produced room temperature water is fed to a steam generator 222 of the waste heat collector boiler 221 by means of a circulation pump 225 to establish a first closed loop.

On the other hand, the gas turbine systems 301, 401 and 501 are provided with respective waste heat collector boilers 309, 409 and 509 for utilizing the waste heat of the systems 301, 401 and 501 and the steam generated by the steam generating sections 308, 408 and 508 of the waste heat collector boilers 309, 409 and 509 is fed to an aggregative steam conduit 230 by way of respective steam collector conduits 311, 411 and 511 and then supplied to a large independent steam turbine 231 to drive the latter.

After passing through the large steam turbine 231, the steam is fed to a steam condenser 233 by way of a conduit 232 and turned back to room temperature water by the steam condenser 233 and the produced room temperature water is fed to the steam generating sections 308, 408 and 508 of the waste heat collector heater 309, 409 and 509 by means of a circulation pump 235 to establish a second closed loop.

Note that the compressors 213, 302, 402 and 502, the combustor 214, 304, 403 and 503, the duct 215, the gas turbines 211, 304, 404 and 504, the rotary shafts 212 and 219, the electric generators 220, 305, 405, 505 and 605 are same as or similar to their counterparts of the known plant of FIG. 1 and the embodiment of FIG. 2 and therefore will not be described any further.

With this arrangement, the steam generated by the existing conventional combined cycle power plant can be fed to the steam cooling sections of the newly constructed gas turbines 304, 404 and 504 and the cooling steam expelled from the gas turbines can be collected by means of the steam cycle of the combined generating system.

On the other hand, the steam generated by the waste heat collector boilers 309, 409 and 509 utilizing the waste heat of the gas turbines 304, 404 and 504 is fed to the independent large steam turbine 231 to generate electricity with a remarkably enhanced efficiency so that the plant can operate with a maximal thermal efficiency.

In short, this embodiment provides a maximal overall thermal efficiency if it is designed as a single combined cycle power plant or as a combination of a plurality of combined cycle power plants.

Additionally, the cooling potential of the cooling steam can be maximally exploited by arranging the gas turbine blades and other gas turbine components in series, in parallel or a combination thereof as the steam used for cooling a plurality of elements is returned to the steam cycle.

In each of the gas turbine system 301, 401 and 501, the piping that connects the dust removing apparatus 170 to the gas turbine is formed of an anti-corrosive alloy.

Figure 15:
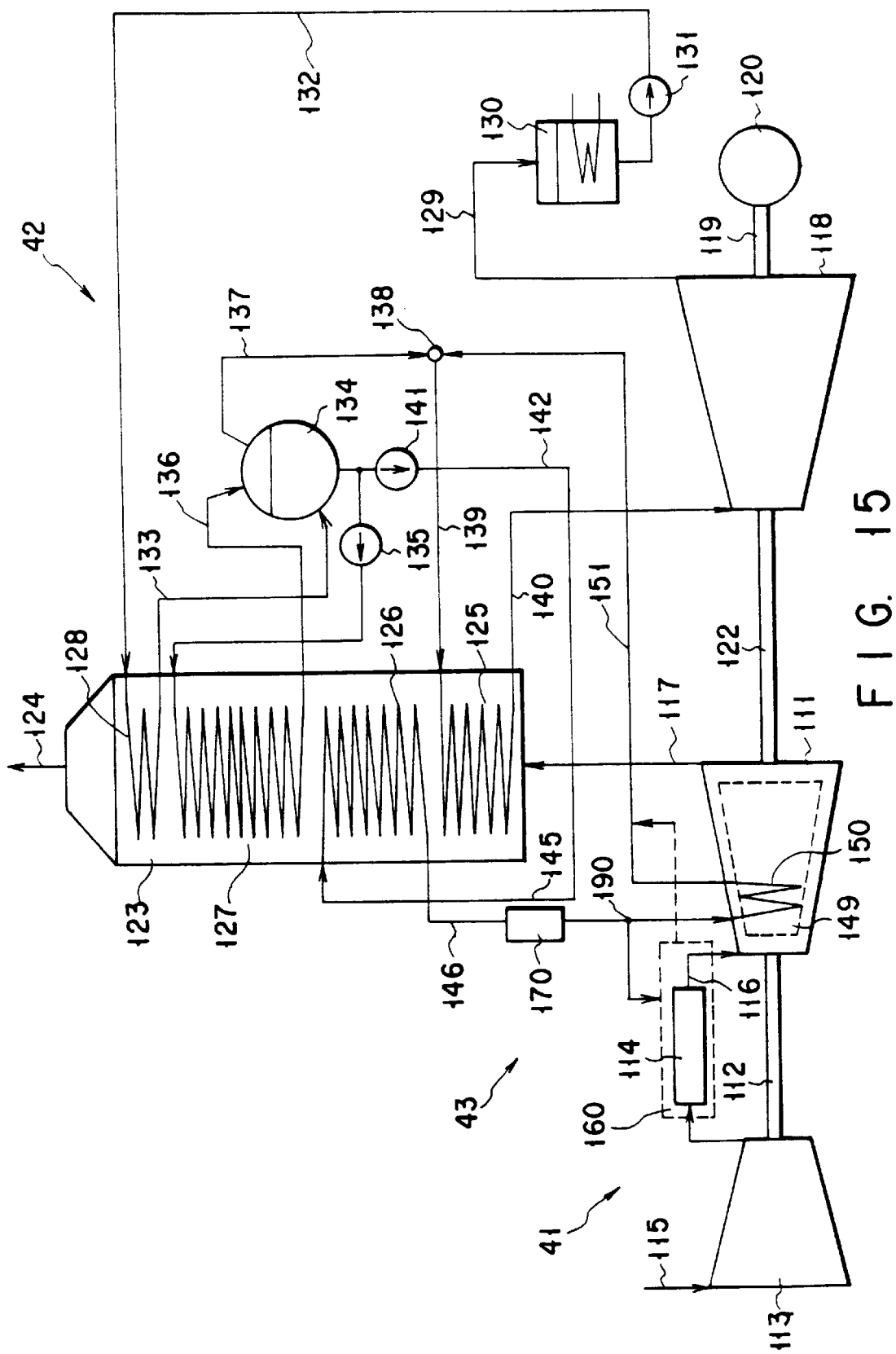
FIG. 15 is a schematic block diagram of an eleventh embodiment of combined cycle power plant according to the invention.

FIG. 15 is a schematic block diagram of an eleventh embodiment of combined cycle power plant according to the invention.

In this embodiment, the gas turbine blades 149 and a cooling section 160 arranged in a peripheral area of the combustor 114 are cooled in parallel by steam flowing through respective branches of the cooling steam supply duct 146 in the gas turbine cooling system 43a. Otherwise, this embodiment is identical with that of FIG. 2 and, therefore, the components of this embodiment that are same as or similar to those of FIG. 2 are denoted respectively by the same reference symbols and will not be described any further.

This arrangement is as effective as the first embodiment of FIG. 2. Additionally, the flow rate of the steam fed to the cooling section 160 in a peripheral area of the combustor 114 and that of the steam fed to the gas turbine blades 149 can be controlled independently to enhance the effect of cooling the different components of the gas turbine system.

Figure 16:
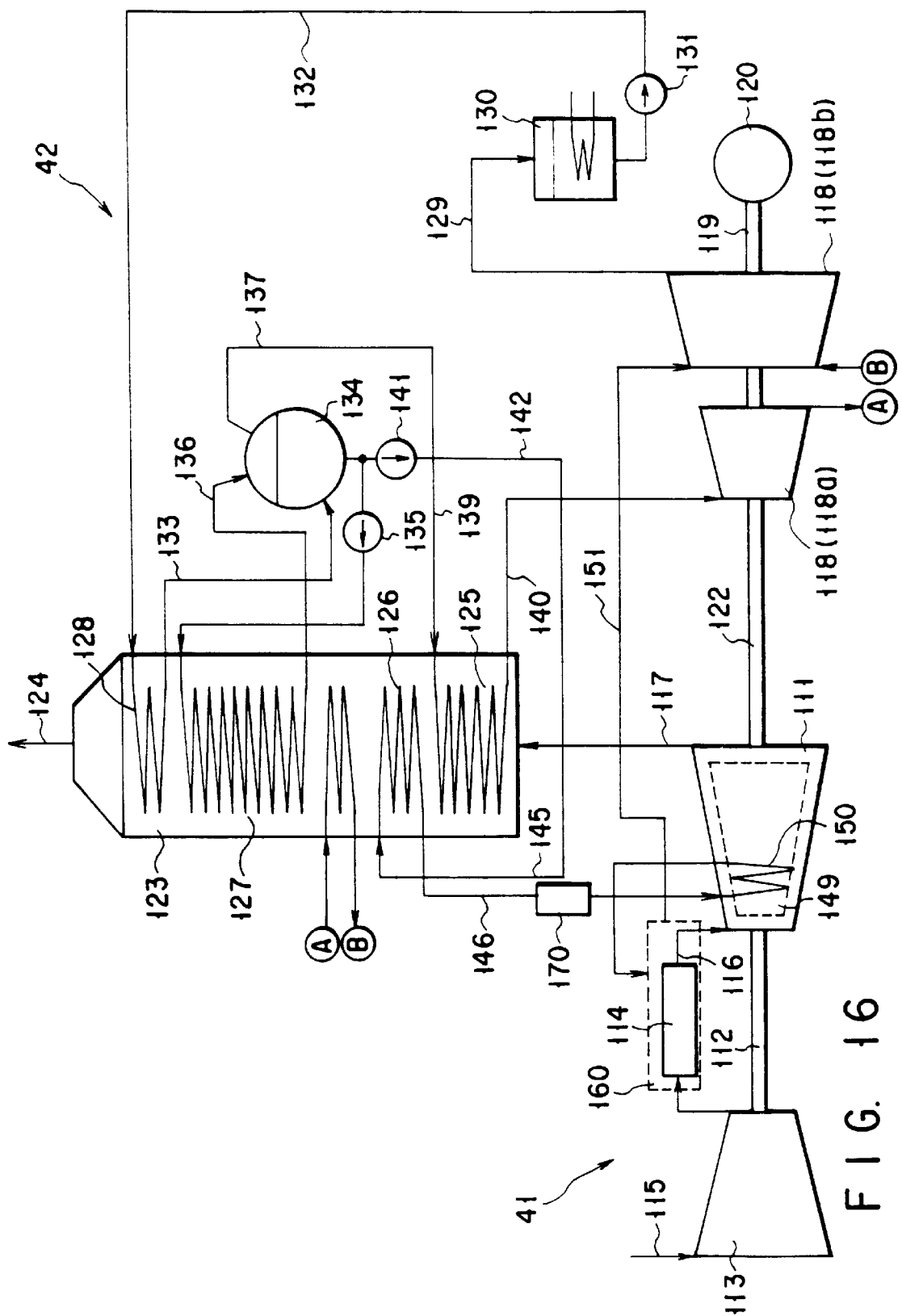
FIG. 16 is a schematic block diagram of a twelfth embodiment of combined cycle power plant according to the invention.

FIG. 16 is a schematic block diagram of a twelfth embodiment of combined cycle power plant according to the invention.

This embodiment is obtained by modifying the embodiment of FIG. 10 in terms of the arrangement of the steam turbine system 42 and that of the waste heat collector boiler 123.

More specifically, in this embodiment, the steam turbine 118 is comprised of a high pressure steam turbine 118a and a low pressure steam turbine 118b and the steam from the high pressure heater 125 of the waste heat collector boiler 123 is fed to the high pressure steam turbine 118a by way of the steam supply duct 140. The steam inflated by the high pressure steam turbine 118a is then collected by steam duct A and returned to the waste heat collector boiler 123, where it is repeated and fed to the low pressure steam turbine 118b. The collected cooling steam coming from the gas turbine cooling system 43a is also fed to the inlet of the low pressure steam turbine 118b. Otherwise, this embodiment is identical with that of FIG. 2 and, therefore, the components of this embodiment that are same as or similar to those of FIG. 2 are denoted respectively by the same reference symbols and will not be described any further.

This arrangement is as effective as the embodiment of FIG. 10. Additionally, the overall thermal efficiency of the plant is further enhanced because of the fact that the steam cycle of this embodiment constitutes a reheating cycle.

FIG. 17 is a schematic block diagram of a thirteenth embodiment of combined cycle power plant according to the invention.

This embodiment is obtained by modifying the twelfth embodiment of FIG. 16 in such a way that the steam inflated by the high pressure steam turbine 118a of the steam turbine 118 and collected from steam duct C is directly fed to the gas turbine cooling system 43 without passing through the waste heat collector boiler 123 in order to cool the gas turbine cooling system 43 and establish a steam reheating cycle. Otherwise, this embodiment is identical with that of FIG. 16 and, therefore, the components of this embodiment that are same as or similar to those of FIG. 16 are denoted respectively by the same reference symbols and will not be described any further.

This arrangement is as effective as the twelfth embodiment of FIG. 16. Additionally, the overall thermal efficiency of the plant is further enhanced at reduced cost because of the simplified configuration of the steam cycle system.

Additional advantages and modifications will readily occur to those skilled in the art. Therefore, the invention in its broader aspects is not limited to the specific details, and representative devices shown and described herein. Accordingly, various modifications may be made without departing from the spirit or scope of the general inventive concept as defined by the appended claims and their equivalents.

What is claimed is:

1. A power generating plant comprising at least first and second combined cycle power generating plants each having at least a gas turbine system and a steam cycle system driven by steam generated by waste heat from the gas turbine system, the power generating plant comprising:

a gas turbine system of said first combined cycle power generating plant having a gas turbine cooling system; and a steam supplying portion configured to supply steam generated by the second combined cycle power generating plant to the gas turbine cooling system of the first combined cycle power generating plant, wherein said first combined cycle power generating plant comprises a dust removing apparatus configured to remove dust from the steam supplied from the second combined cycle power generating plant.

2. The power generating plant according to claim 1, wherein said dust removing apparatus includes two or more than two dust removing units arranged in parallel and operated selectively such that one of the dust removing units cleanses steam, while the other dust removing unit is regenerated through the removal of the dust caught by the other dust removing unit.

3. A power generating plant comprising:

a first combined cycle power generating plant having at least one steam turbine, at least one gas turbine cooled by air, and at least one heat collection boiler which generates steam using heat exhausted from the gas turbine;

a second combined cycle power generating plant having at least one steam turbine arranged on a steam turbine axis, a plurality of gas turbines cooled by cooling steam and each arranged on a respective gas turbine axis, and a plurality of heat collection boilers which generate steam using heat exhausted from the gas turbines, said steam turbine axis and said respective gas turbine axes being different from each other;

a first piping system for connecting the first combined cycle power generating plant and the second combined cycle power generating plant to each other, said first piping system being configured to supply at least part of steam generated by the heat collection boiler of the first combined cycle power generating plant to at least one of the gas turbines of the second combined cycle power generating plant as cooling steam; and a second piping system for connecting the first combined cycle power generating plant and the second combined cycle power generating plant to each other, said second piping system being configured to collect at least part of the cooling steam that cools the gas turbines, and to return the collected cooling steam to a steam cycle of the first combined cycle power generating plant.

4. A power generating plant according to claim 1, wherein said dust removing apparatus and said gas turbine cooling system are connected together by piping formed of an anti-corrosive alloy.

5. The power generating plant according to claim 3, wherein:

said first combined cycle power generating plant comprises a dust removing apparatus configured to remove dust from the steam supplied from the second combined cycle power generating plant, and said dust removing apparatus includes two or more than two dust removing units arranged in parallel and operated selectively such that one of the dust removing units cleanses steam, while the other dust removing unit is regenerated through the removal of the dust caught by the other removing unit.

6. The power generating plant according to claim 4, wherein said dust removing apparatus includes two or more than two dust removing units arranged in parallel and operated selectively such that one of the dust removing units cleanses steam, while the other dust removing unit is regenerated through the removal of the dust caught by the other removing unit.

* * * * *